US011356038B2

(12) United States Patent
Amimoto et al.

(10) Patent No.: US 11,356,038 B2
(45) Date of Patent: Jun. 7, 2022

(54) POWER CONVERSION DEVICE

(71) Applicant: Mitsubishi Electric Corporation, Tokyo (JP)

(72) Inventors: Takeshi Amimoto, Tokyo (JP); Yu Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/296,551

(22) PCT Filed: Jan. 28, 2019

(86) PCT No.: PCT/JP2019/002644
§ 371 (c)(1),
(2) Date: May 25, 2021

(87) PCT Pub. No.: WO2020/157787
PCT Pub. Date: Aug. 6, 2020

(65) Prior Publication Data
US 2022/0014115 A1    Jan. 13, 2022

(51) Int. Cl.
*H02M 7/5395*    (2006.01)
*H02M 1/42*      (2007.01)
*H02M 7/48*      (2007.01)
*H02M 1/00*      (2006.01)
*H02M 7/493*     (2007.01)

(52) U.S. Cl.
CPC ......... *H02M 7/5395* (2013.01); *H02M 1/007* (2021.05); *H02M 1/4283* (2021.05); *H02M 7/493* (2013.01); *H02M 1/4225* (2013.01); *H02M 7/48* (2013.01)

(58) Field of Classification Search
CPC ..... H02M 7/48; H02M 7/5395; H02M 1/4225
See application file for complete search history.

(56) References Cited

U.S. PATENT DOCUMENTS

2016/0380575 A1*  12/2016  Tsumura ............... F25B 49/025
                                              318/478
2017/0229978 A1*  8/2017   Ayai ........................ H02M 7/48

FOREIGN PATENT DOCUMENTS

| CN | 104953882 A  | * | 9/2015  | ............. H02J 3/385 |
| EP | 2651021 A2   | * | 10/2013 | .......... H02M 1/4225 |
| JP | 2007-221892 A |   | 8/2007  | |
| JP | 2013055794 A | * | 3/2013  | |

OTHER PUBLICATIONS

International Search Report and Written Opinion dated Mar. 19, 2019, received for PCT Application PCT/JP2019/002644, Filed on Jan. 28, 2019, 6 pages including English Translation.

* cited by examiner

*Primary Examiner* — Gary A Nash
(74) *Attorney, Agent, or Firm* — Xsensus LLP

(57) ABSTRACT

When an inverter and a converter are merely operated with their carrier waves synchronized with each other, current ripple of a smoothing capacitor connected therebetween might be increased. Accordingly, bipolar modulation PWM control is performed on the inverter, PWM control is performed on the converter, and the phase of the carrier wave for the inverter or the converter is shifted on the basis of AC output, whereby timings of currents flowing into the smoothing capacitor are made different from each other.

13 Claims, 21 Drawing Sheets

FIG. 13

| CONVERTER TRIANGULAR WAVE FREQUENCY : INVERTER TRIANGULAR WAVE FREQUENCY | SMOOTHING CAPACITOR HIGH-FREQUENCY CURRENT EFFECTIVE VALUE (NO INVERSION) | SMOOTHING CAPACITOR HIGH-FREQUENCY CURRENT EFFECTIVE VALUE (WITH INVERSION) |
|---|---|---|
| 1:1 | 18.5 | 14.1 |
| 1:2 | 18.5 | 18.2 |
| 1:3 | 18.5 | 18.3 |
| 1:4 | 19.0 | 18.8 |
| 1:5 | 18.9 | 18.2 |
| 2:1 | 15.4 | 15.3 |
| 3:1 | 18.5 | 16.4 |
| 4:1 | 17.2 | 17.2 |
| 5:1 | 18.4 | 17.6 |

POWER CONVERSION DEVICE

CROSS-REFERENCE TO RELATED APPLICATION

The present application is based on PCT filing PCT/JP2019/002644, filed Jan. 28, 2019, the entire contents of which are incorporated herein by reference.

TECHNICAL FIELD

The present disclosure relates to a power conversion device.

BACKGROUND ART

In a case of converting a DC power supply or a storage battery to AC power, a converter for stepping up or down DC voltage to be converted to stable DC voltage, and an inverter for converting the DC power to AC power, are used. The converter and the inverter perform power conversion through switching operations of semiconductor switching elements. Then, in order to convert the power supply voltage of the converter to stable DC voltage, a smoothing capacitor for smoothing the voltage is connected on the output side of the converter.

The smoothing capacitor is used for stabilizing the DC voltage, and as the smoothing capacitor, the one having a large capacitance is often used. Increasing the capacitance results in size increase of the capacitor, and this might lead to increase in the device size.

In the converter and the inverter, current of a high-frequency ripple component (high-frequency ripple current) occurs due to switching operations of the semiconductor switching elements. This current flows into the smoothing capacitor. This high-frequency ripple current causes an electrolytic capacitor to generate heat. Therefore, it is necessary to select the capacitor considering the above, and in some cases, the capacitance of the capacitor might be increased more than necessary. In the above circumstances, as a method for reducing high-frequency ripple current flowing into the capacitor, there is a method in which a converter performs pulse width modulation (PWM) operation and an inverter performs complementary PWM operation, and the converter and the inverter are driven synchronously, to reduce high-frequency ripple current flowing through the capacitor, as described in Patent Document 1.

CITATION LIST

Patent Document

Patent Document 1: Japanese Laid-Open Patent Publication No. 2007-221892

SUMMARY OF THE INVENTION

Problems to be Solved by the Invention

Since the inverter having a full-bridge configuration described in Patent Document 1 operates through complementary pulse width modulation, there is a condition in which, in U phase and V phase, the switching elements on the upper side are ON and the switching elements on the lower side are OFF, or the switching elements on the upper side are OFF and the switching elements on the lower side are ON. Therefore, in a case of applying the above configuration to a grid interconnection inverter, the neutral point in the inverter greatly varies, thus causing a problem that leakage current of a high-frequency component occurs.

The present disclosure has been made to solve the above problem, and an object of the present disclosure is to obtain a power conversion device that does not cause leakage current of a high-frequency component and can reduce high-frequency ripple current.

Solution to the Problems

A power conversion device according to the present disclosure includes: a first conversion unit for outputting DC power through power conversion; a second conversion unit for converting the DC power to AC power; a capacitor for smoothing DC voltage between the first conversion unit and the second conversion unit; and a control unit for performing PWM control of the first conversion unit and bipolar modulation PWM control of the second conversion unit, wherein a frequency of a first carrier wave for the PWM control of the first conversion unit and a frequency of a second carrier wave for the bipolar modulation PWM control of the second conversion unit are synchronized with each other, and the control unit shifts a phase of one carrier wave of the first and second carrier waves between a case where an output of the second conversion unit is positive and a case where the output of the second conversion unit is negative, so that timings of currents flowing into the capacitor from the first conversion unit and the second conversion unit differ from each other.

Effect of the Invention

The power conversion device according to the present disclosure enables reduction in high-frequency ripple current flowing to a capacitor in an inverter capable of grid interconnection and subjected to bipolar modulation PWM control, thus making it possible to reduce the capacitance of the capacitor and reduce the size.

BRIEF DESCRIPTION OF THE DRAWINGS

FIG. 13 shows the relationship between the frequency of the converter and the frequency of the inverter, and the effective value of high-frequency current in the smoothing capacitor, according to embodiment 1.

DESCRIPTION OF EMBODIMENTS

Figure 1:
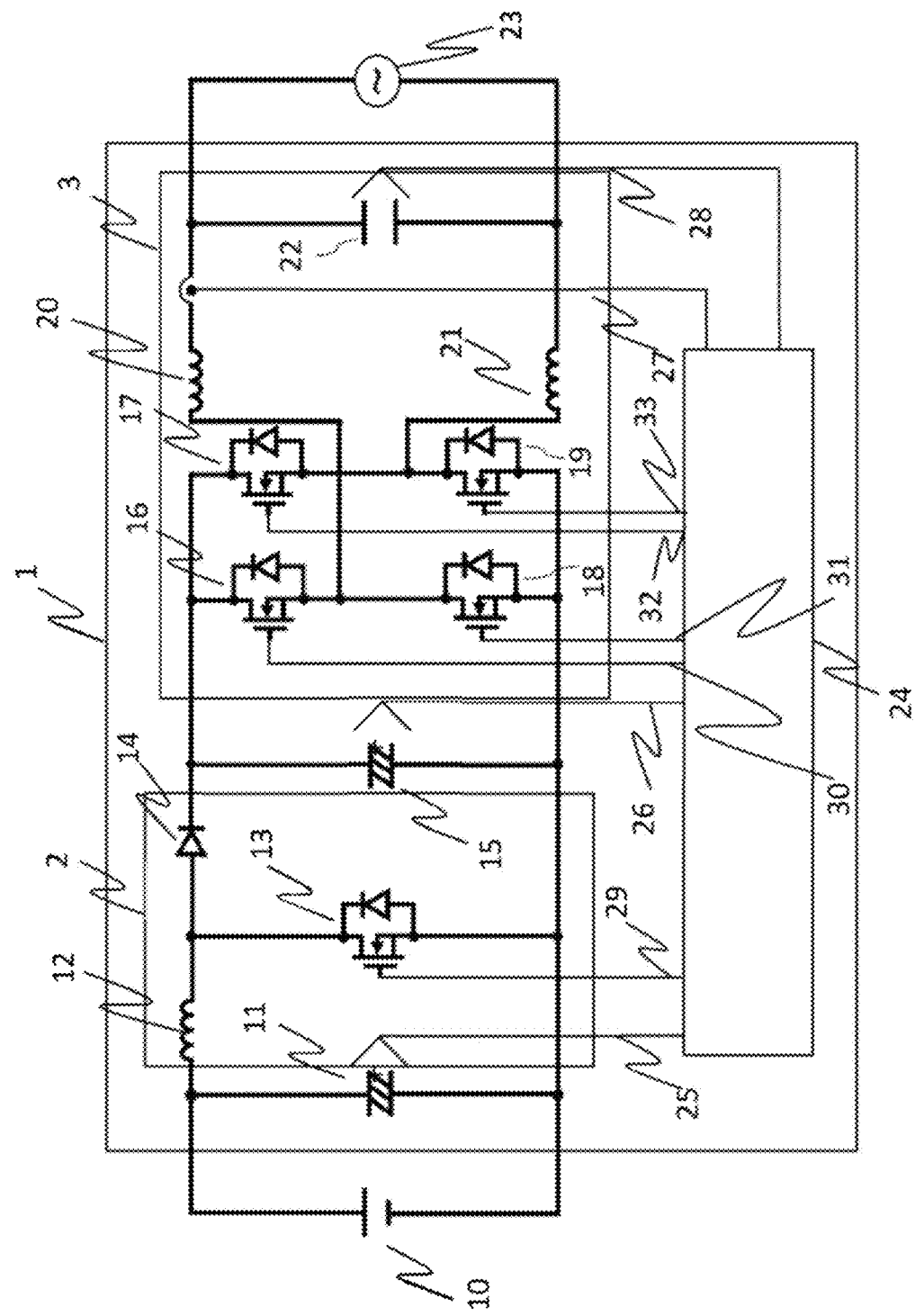
FIG. 1 is a diagram showing the circuit configuration of a power conversion device according to embodiment 1.

Hereinafter, preferred embodiments of a power conversion device according to the present disclosure will be described with reference to the drawings. It is noted that the same components and corresponding parts are denoted by the same reference characters, and the detailed description thereof is omitted. Also in the other embodiments, components denoted by the same reference characters will not be repeatedly described.

Embodiment 1

<Schematic Configuration of the Present Disclosure>

FIG. 1 shows the circuit configuration of a power conversion device 1 according to embodiment 1. The power conversion device 1 is composed of a converter 2, an inverter 3, and a control device 24, a DC power supply 10 is connected at the input of the converter 2, and a grid 23 is connected at the output of the inverter 3.

The converter 2 is composed of a reactor 12, a semiconductor switching element 13, and a diode 14. The reactor 12 has two terminals, the semiconductor switching element 13 has three terminals of a positive electrode, a negative electrode, and a control electrode, and the diode 14 has two terminals of an anode and a cathode.

One end of the reactor 12 is connected to the positive electrode of the semiconductor switching element 13 and the anode of the diode 14, and another end of the reactor 12 is connected to the positive side of the DC power supply 10. The negative side of the DC power supply 10 is connected to the negative electrode of the semiconductor switching element 13. On the input side of the converter 2, a smoothing capacitor 11 is connected in parallel to the DC power supply 10. On the output side of the converter 2, the positive side of a smoothing capacitor 15 is connected to the cathode of the diode 14, and the negative side thereof is connected to the negative electrode of the semiconductor switching element 13.

The inverter 3 is composed of semiconductor switching elements 16 to 19, reactors 20, 21, and a capacitor 22. The input of the inverter 3 and the output of the converter 2 are connected to each other, and the output of the inverter 3 and the grid 23 are connected to each other. The positive electrode of the semiconductor switching element 16 and the positive electrode of the semiconductor switching element 17 are connected to the positive side of the smoothing capacitor 15. The negative electrode of the semiconductor switching element 16 and the positive electrode of the semiconductor switching element 18 are connected to each other, and the negative electrode of the semiconductor switching element 17 and the positive electrode of the semiconductor switching element 19 are connected to each other. The negative electrode of the semiconductor switching element 18 and the negative electrode of the semiconductor switching element 19 are connected to each other, and connected to the negative side of the smoothing capacitor 15.

The connection point between the semiconductor switching element 16 and the semiconductor switching element 18 is connected to one end of the reactor 20, and the connection point between the semiconductor switching element 17 and the semiconductor switching element 19 is connected to one end of the reactor 21. Another end of the reactor 20 and another end of the reactor 21 are connected to both ends of the capacitor 22. One end of the capacitor 22 is connected to one end of the grid 23, and another end of the capacitor 22 is connected to another end of the grid 23.

The DC power supply 10 on the input side of the converter 2 is formed from, for example, a storage battery, a DC stabilized power supply, a solar battery, or the like. A battery of an electric vehicle may be used as the DC power supply 10. The grid 23 on the output side of the inverter 3 may be, for example, a load that consumes power. The output of the inverter 3 may be a single-phase two-line output or a single-phase three-line output. The diode 14 of the converter 2 may be replaced with a semiconductor switching element. In a case of using a semiconductor switching element, current, i.e., power can be supplied from the output side of the inverter 3 to the input side of the converter 2. In this case, the DC power supply 10 may be replaced with a secondary battery such as a storage battery, or a load. In FIG. 1, the semiconductor switching elements 13, 16 to 19 are assumed to be metal-oxide-semiconductor field-effect-transistors (MOSFET). However, insulated gate bipolar transistors (IGBT) may be used. Since the MOSFET has a body diode, current can flow from the negative electrode to the positive electrode, but in a case of the IGBT, a diode needs to be additionally connected in antiparallel thereto. The smoothing capacitor on the input side of the converter may not necessarily be provided.

The control device 24 drives the semiconductor switching element 13 and the semiconductor switching elements 16 to 19, using drive signals 29 to 33. For this driving, detection values of a converter input voltage detector 25, a converter output voltage detector 26, an inverter output current detector 27, and an inverter output voltage detector 28 are acquired, and the driving is performed on the basis of the detection values and command values.

Figure 2:
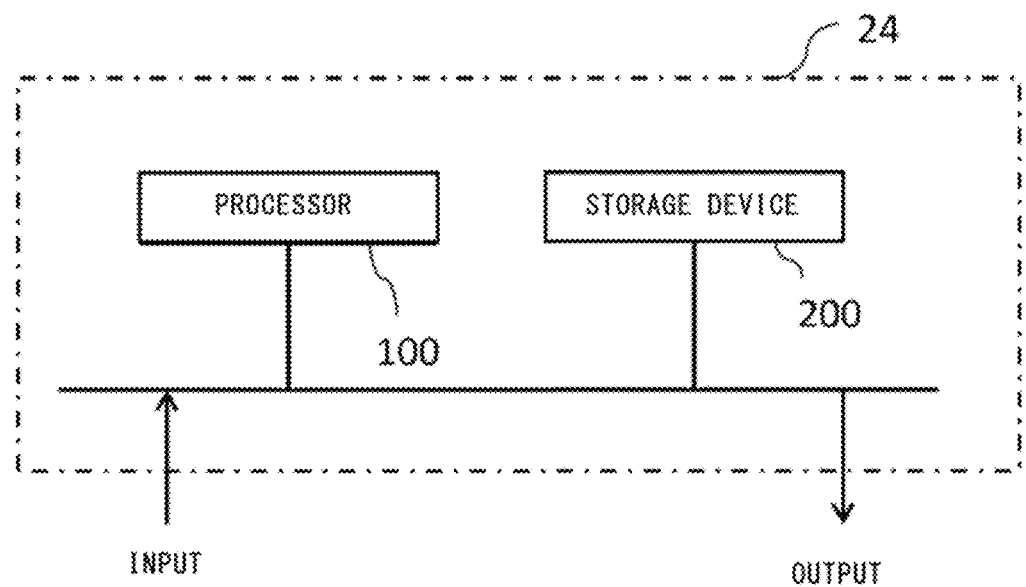
FIG. 2 is a hardware configuration diagram of a control device according to embodiment 1.

FIG. 2 shows an example of the hardware configuration of the control device 24. The control device 24 is composed of a processor 100 such as a microcomputer and a storage device 200, and although not shown, the storage device 200 is provided with a volatile storage device such as a random access memory, and a nonvolatile auxiliary storage device such as a flash memory. Instead of a flash memory, an auxiliary storage device of a hard disk may be provided. The processor 100 executes a program inputted from the storage device 200, to perform a part or the entirety of control for the semiconductor switching elements on the basis of measured values from the output current detector and the output voltage detectors for the inverter and the converter as described above. In this case, the program is inputted from the auxiliary storage device to the processor 100 via the volatile storage device. The processor 100 may output data such as a calculation result to the volatile storage device of the storage device 200, or may store such data into the auxiliary storage device via the volatile storage device. In addition to the processor 100 and the storage device 200, a logic circuit and/or an analog circuit may be used in combination. On the basis of the control signal processed by the processor 100, the drive signal 29 is outputted to the semiconductor switching element 13, and the drive signals 30 to 33 are outputted to the semiconductor switching elements 16, 17, 18, 19, whereby these semiconductor switching elements are driven.

[Reason for Performing Control of Inverter 3 of the Present Disclosure by Bipolar Modulation]

(1) Description 1 of Unipolar Modulation

Figure 3:
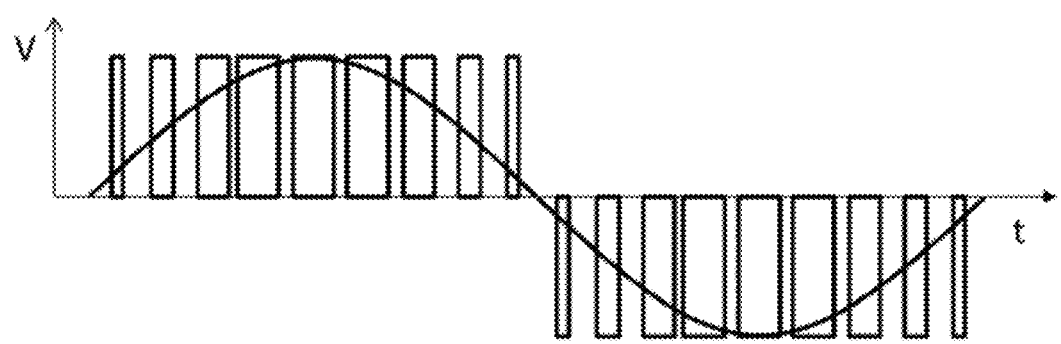
FIG. 3 illustrates unipolar modulation.

As control methods for the inverter 3, there are unipolar modulation and bipolar modulation. The unipolar modulation is a modulation method capable of outputting AC voltage with the output voltage of the inverter 3 in three states of positive, negative, and zero. That is, as shown in FIG. 3 in which the vertical axis indicates voltage and the horizontal axis indicates time, for outputting positive voltage of AC, the output voltage of the inverter is generated at positive and zero levels, and for outputting negative voltage of AC, the output voltage of the inverter 3 is generated at negative and zero levels.

(2) Description 2 of Unipolar Modulation Control
<Case where Grid Voltage is Positive>

Figure 4A:
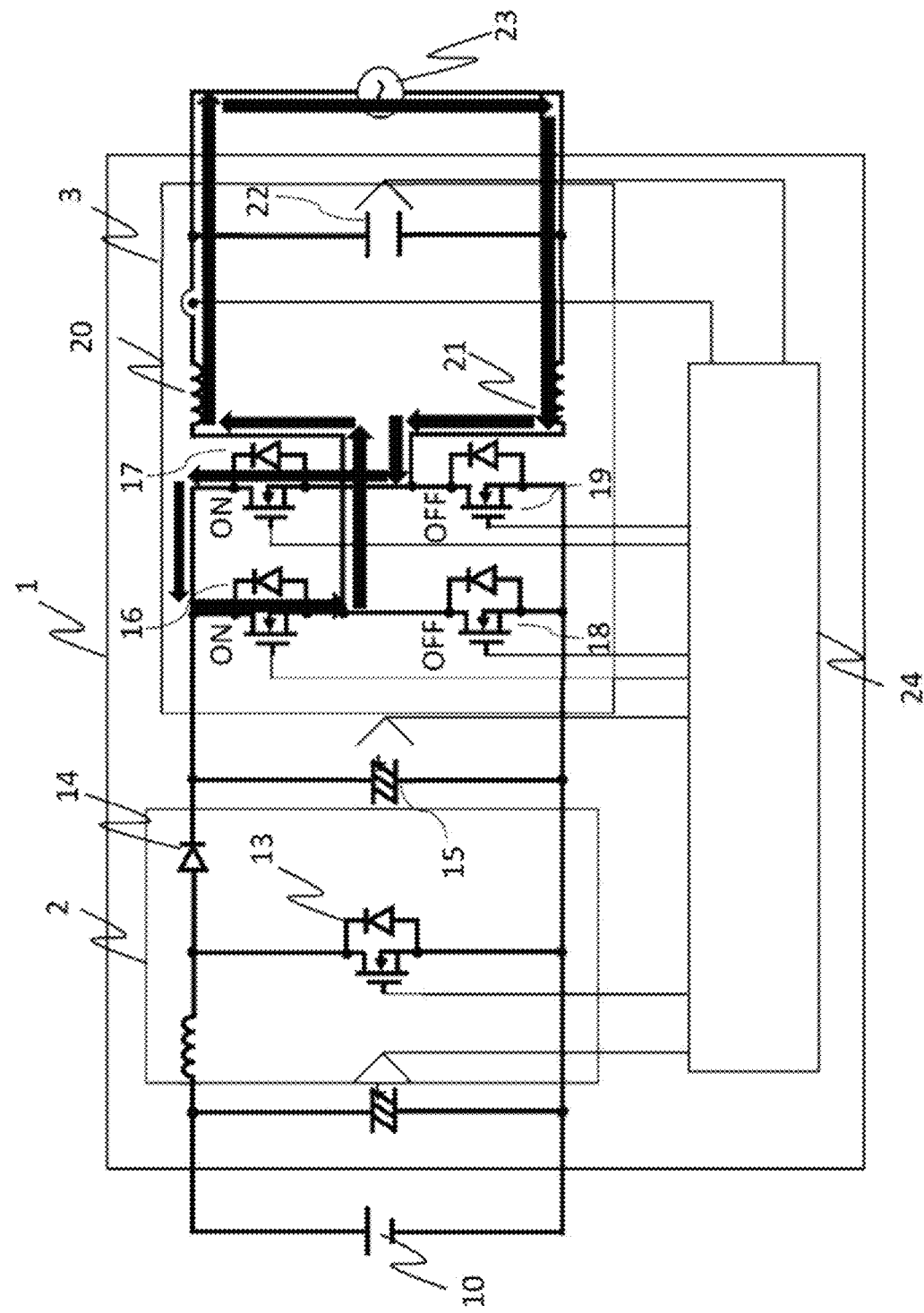
FIG. 4A illustrates operation of an inverter in unipolar modulation control.

In a switching method for the semiconductor switching elements to perform control by unipolar modulation, for example, as shown in FIG. 4A, when the grid voltage is positive, the semiconductor switching element 16 is constantly turned ON, the semiconductor switching element 18 is constantly turned OFF, and the semiconductor switching element 17 and the semiconductor switching element 19 are subjected to PWM control based on comparison between a triangular wave carrier and a command value.

A case where the power factor is 1 is shown as an example. When the semiconductor switching element 17 is ON, the semiconductor switching element 19 is OFF. As shown by arrows in FIG. 4A, current flows through a route passing the semiconductor switching element 16, the reactor 20, the grid 23, the reactor 21, and the semiconductor switching element 17. At this time, voltage of the smoothing capacitor 15 is not outputted at the output end of the inverter 3, i.e., the output voltage is zero.

Figure 4B:
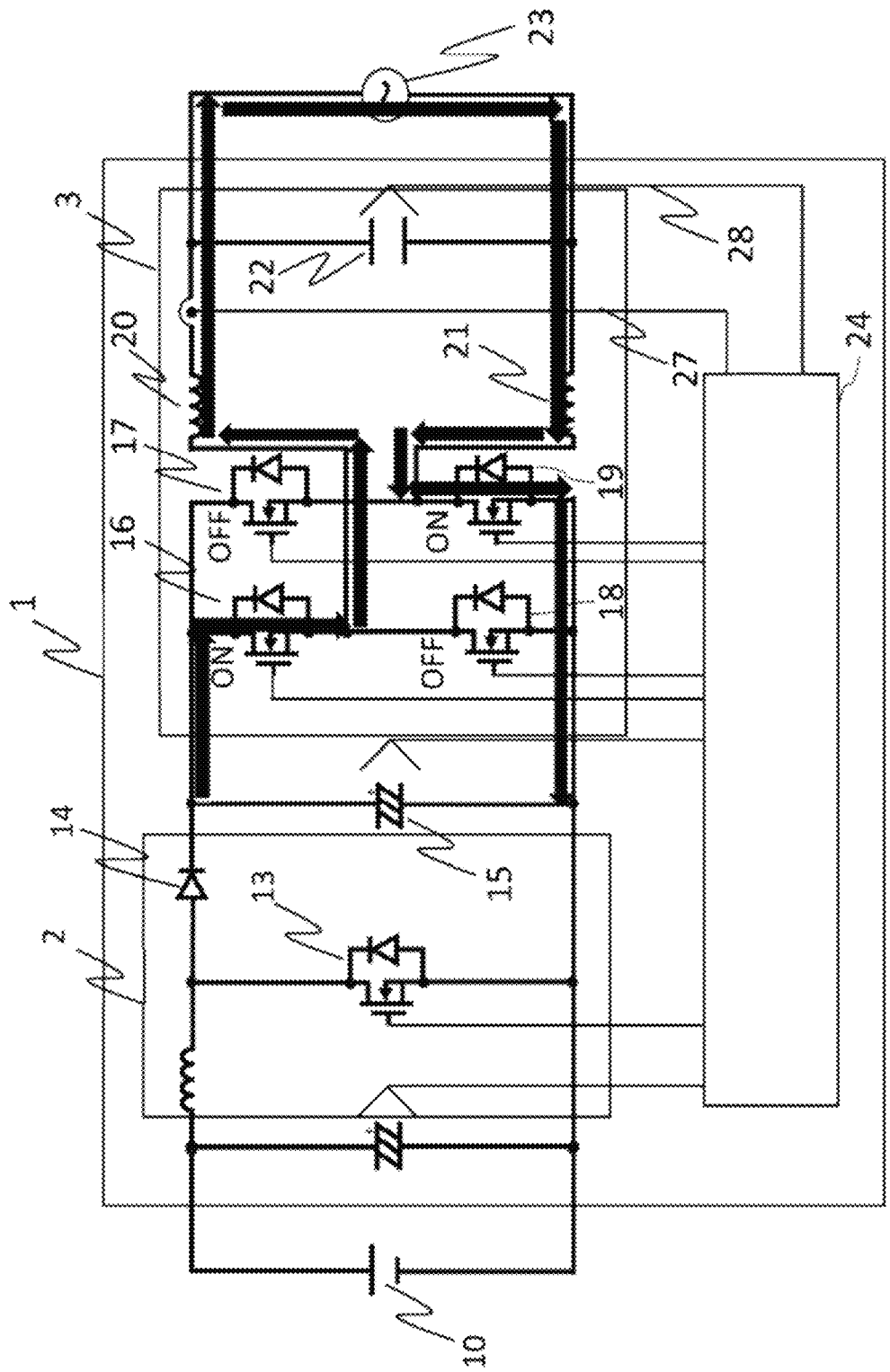
FIG. 4B illustrates operation of the inverter in unipolar modulation control.

When the semiconductor switching element 17 is OFF and the semiconductor switching element 19 is ON, as shown by arrows in FIG. 4B, current flows through a route passing the semiconductor switching element 16, the reactor 20, the grid 23, the reactor 21, the semiconductor switching element 19, and the smoothing capacitor 15. At this time, at the output of the inverter 3, voltage of the smoothing capacitor 15 is outputted. As described above, during the period in which the semiconductor switching element 16 is constantly ON, only positive voltage and zero voltage are outputted as the output of the inverter 3.

(3) Description 3 of Unipolar Modulation Control
<Case where Grid Voltage is Negative>

Figure 4C:
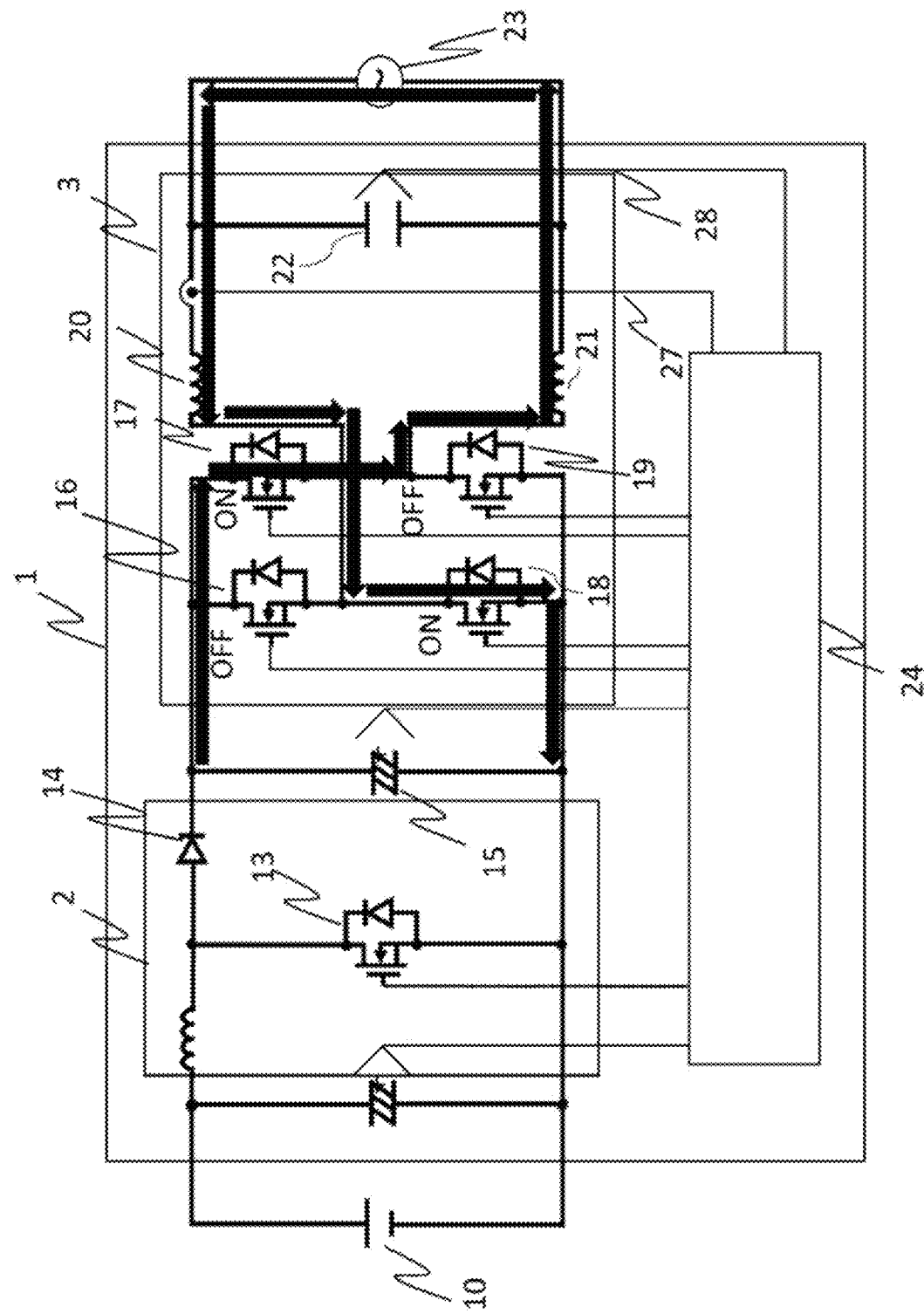
FIG. 4C illustrates operation of the inverter in unipolar modulation control.

As shown in FIG. 4C, when the grid voltage is negative, the semiconductor switching element 16 is constantly turned OFF, the semiconductor switching element 18 is constantly turned ON, and the semiconductor switching element 17 and the semiconductor switching element 19 are subjected to PWM control based on comparison between a triangular wave carrier and a command value. When the semiconductor switching element 17 is ON, as shown by arrows in FIG. 4C, current flows through a route passing the semiconductor switching element 17, the reactor 21, the grid 23, the reactor 20, the semiconductor switching element 18, and the smoothing capacitor 15. At this time, at the output of the inverter 3, voltage of the smoothing capacitor 15 is outputted in the reverse direction and thus negative voltage is outputted.

Figure 4D:
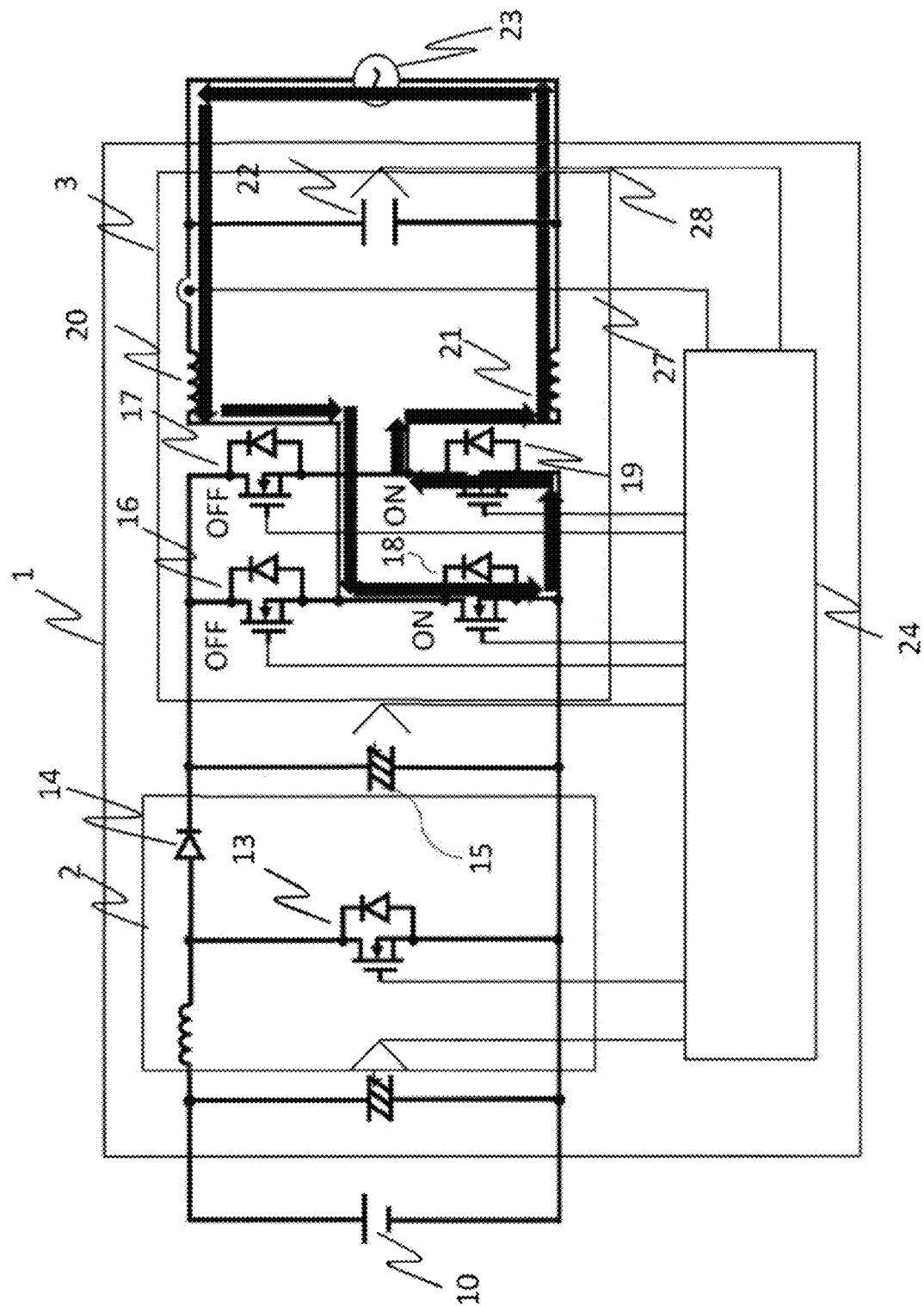
FIG. 4D illustrates operation of the inverter in unipolar modulation control.

On the other hand, in a case where the semiconductor switching element 17 is OFF and the semiconductor switching element 19 is ON, as shown by arrows in FIG. 4D, current flows through a route passing the semiconductor switching element 19, the reactor 21, the grid 23, the reactor 20, and the semiconductor switching element 18. At this time, at the output of the inverter 3, voltage of the smoothing capacitor 15 is not outputted, i.e., the output voltage is zero.

As described above, the output of the inverter 3 is generated with only positive voltage and zero voltage when the grid voltage is positive, and is generated with only negative voltage and zero voltage when the grid voltage is negative. Here, the semiconductor switching element 16 and the semiconductor switching element 18 perform constantly-ON and constantly-OFF operations in accordance with whether the grid is positive or negative. However, the semiconductor switching element 17 and the semiconductor switching element 19 may perform constantly-ON and constantly-OFF operations in accordance with whether the grid is positive or negative, and the semiconductor switching element 16 and the semiconductor switching element 18 may be subjected to PWM control based on comparison between a triangular wave carrier and a command value.

(4) Description 1 of Bipolar Modulation Control

Figure 5:
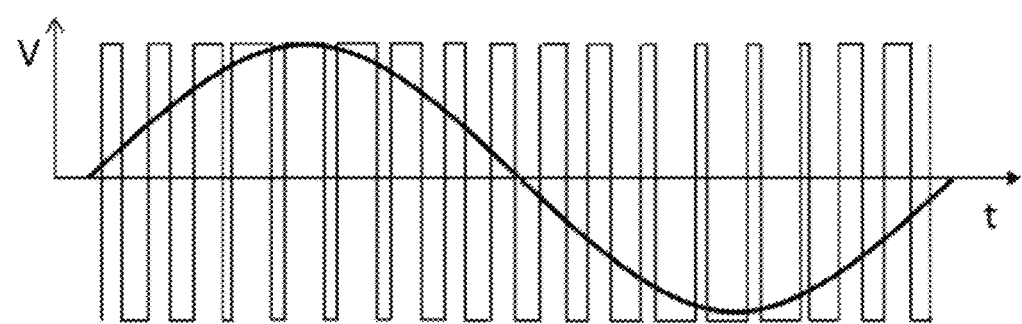
FIG. 5 illustrates bipolar modulation.

In contrast to the above, in bipolar modulation, the output voltage of the inverter can be outputted only in two states of positive and negative. In this modulation method, as shown in FIG. 5, for outputting positive voltage of AC, the output voltage of the inverter is generated at positive and negative levels, and also for outputting negative voltage of AC, the output voltage of the inverter is generated at positive and negative levels.

The switching method for the semiconductor switching elements is as follows. The semiconductor switching element 16 and the semiconductor switching element 19 are turned ON or OFF always at the same time, and the semiconductor switching element 18 and the semiconductor switching element 17 are turned ON or OFF always at the same time. The semiconductor switching element 16 and the semiconductor switching element 18 are operated so as not to be turned ON at the same time. The semiconductor switching element 17 and the semiconductor switching element 19 are operated so as not to be turned ON at the same time.

(5) Description 2 of Bipolar Modulation Control
<Case where Grid Voltage is Positive>

A case where the power factor is 1 is shown as an example. When the grid voltage is positive and the semiconductor switching element 16 and the semiconductor switching element 19 are ON, as shown by arrows in FIG. 6A, current flows through a route passing the semiconductor switching element 16, the reactor 20, the grid 23, the reactor 21, the semiconductor switching element 19, and the smoothing capacitor 15. At this time, as the output voltage of the inverter, voltage of the smoothing capacitor 15 is outputted in the positive direction.

Figure 6A:
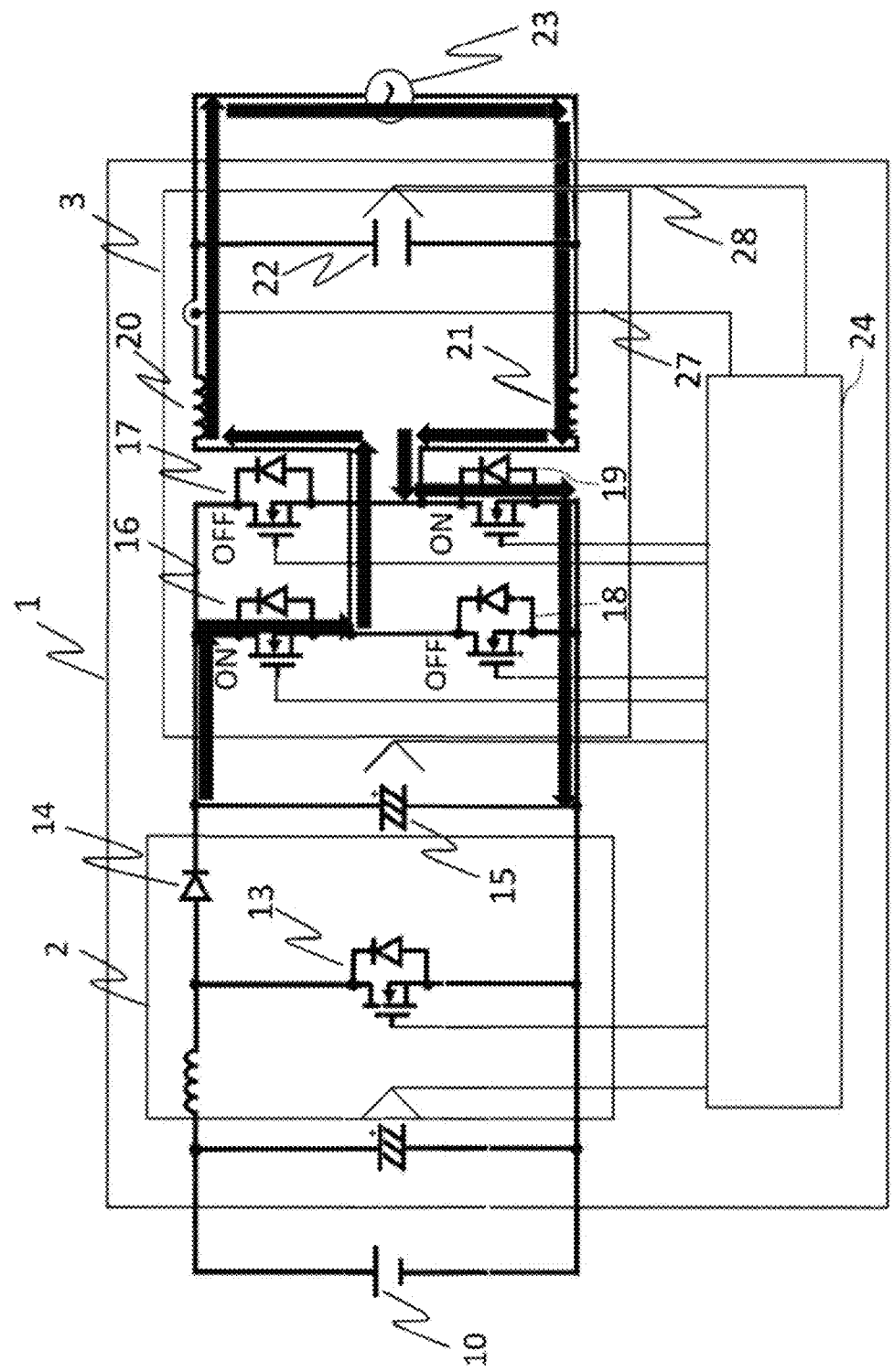
FIG. 6A illustrates operation of the inverter in bipolar modulation control.
Figure 6B:
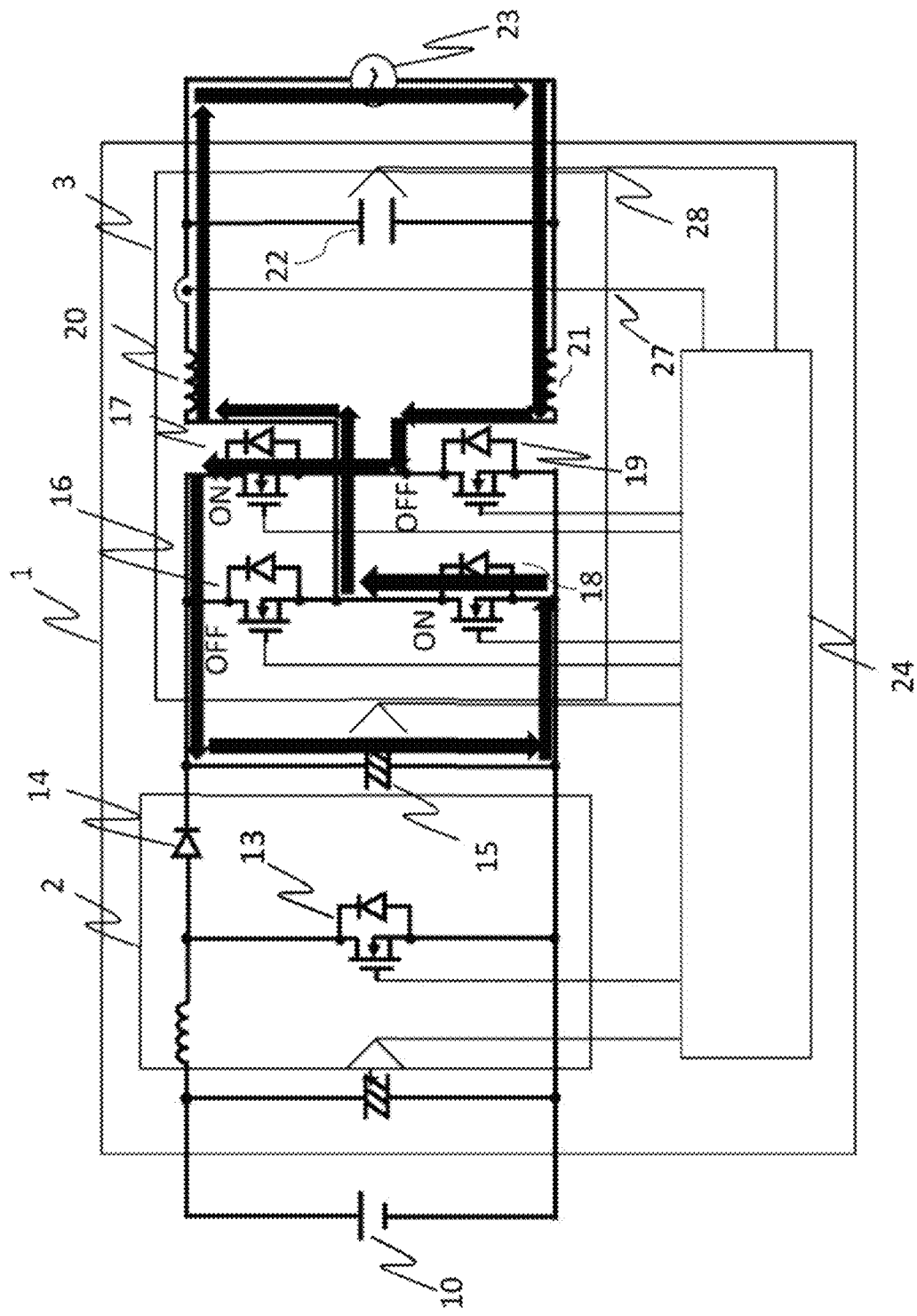
FIG. 6B illustrates operation of the inverter in bipolar modulation control.

When the grid voltage is positive and the semiconductor switching element 17 and the semiconductor switching element 18 are ON, as shown by arrows in FIG. 6B, current flows through a route passing the semiconductor switching element 18, the reactor 20, the grid 23, the reactor 21, the semiconductor switching element 17, and the smoothing capacitor 15. At this time, as the output voltage of the inverter 3, voltage of the smoothing capacitor 15 is outputted in the negative direction. As described above, the output of the inverter 3 is made at either a positive level or a negative level, and an AC waveform is generated with the voltage thereof.

(6) Description 3 of Bipolar Modulation Control
<Case where Grid Voltage is Negative>

Figure 6C:
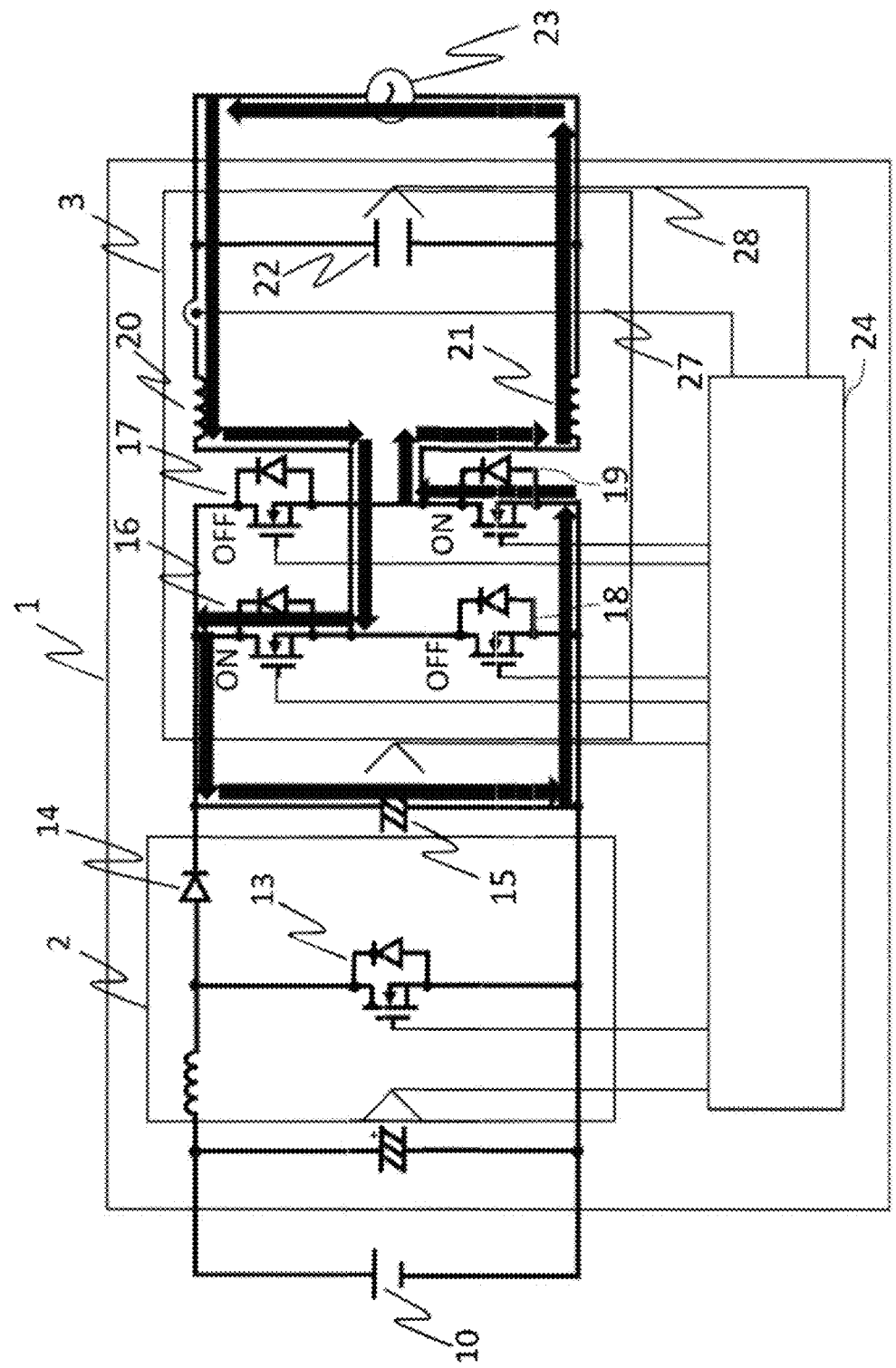
FIG. 6C illustrates operation of the inverter in bipolar modulation control.

When the grid voltage is negative and the semiconductor switching element 16 and the semiconductor switching element 19 are ON, as shown by arrows in FIG. 6C, current flows through a route passing the semiconductor switching element 19, the reactor 21, the grid 23, the reactor 20, the semiconductor switching element 16, and the smoothing capacitor 15. At this time, as the output voltage of the inverter 3, voltage of the smoothing capacitor 15 is outputted in the positive direction.

Figure 6D:
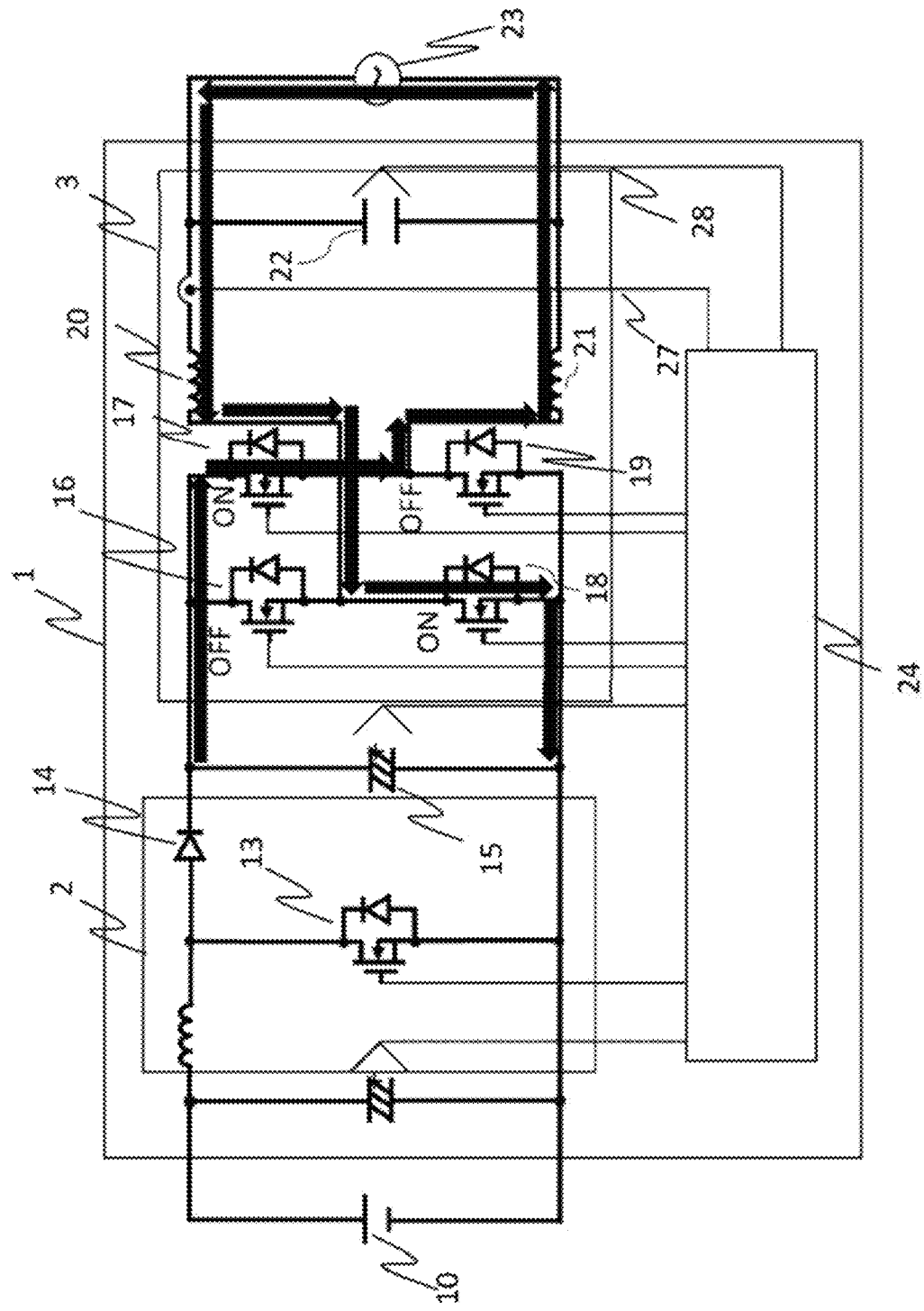
FIG. 6D illustrates operation of the inverter in bipolar modulation control.

When the grid voltage is negative and the semiconductor switching element 17 and the semiconductor switching element 18 are ON, as shown by arrows in FIG. 6D, current flows through a route passing the semiconductor switching element 17, the reactor 21, the grid 23, the reactor 20, the semiconductor switching element 18, and the smoothing capacitor 15. At this time, as the output voltage of the inverter 3, voltage of the smoothing capacitor 15 is outputted in the negative direction.

(7) Problem with Unipolar Modulation

As described in FIG. 4A to FIG. 4D, in the unipolar modulation, an element that is constantly ON is included during a positive period or a negative period of AC. For example, in a case where the semiconductor switching element 16 is constantly ON, the lower side of the grid 23 is constantly conductive to (at the same potential as) the negative side of the smoothing capacitor 15. Further, the lower side of the grid 23 is constantly conductive to (at the same potential as) the negative side of the DC power supply 10. Voltage on the lower side of the grid 23 oscillates as AC voltage with respect to the ground point, and therefore the potential on the negative side of the DC power supply 10 oscillates with respect to the ground point. Although not shown here, in a case where the DC power supply 10 has a stray capacitance with respect to the ground point, the potential varies with respect to the ground point. Thus, leakage current flows through the stray capacitance in accordance with the potential variation. Similarly, also in a case where the semiconductor switching element 16 is constantly ON, the upper side of the grid voltage is at the same potential as the positive side of the smoothing capacitor 15. When the voltage thereof varies, the potential on the negative side of the smoothing capacitor 15 with respect to the ground point also varies, and the potential on the negative side of the DC power supply 10 varies with respect to the ground point, so that leakage current flows via the stray capacitance. If leakage current increases, there is a risk of electric shock when a housing storing the power conversion device is touched.

(8) Advantage of Bipolar Modulation

In contrast, in the bipolar modulation, as described in FIG. 6A to FIG. 6D, the semiconductor switching elements 16 to 19 constantly perform switching, and connection of the positive side or the negative side of the smoothing capacitor 15 is switched with respect to the positive side or the negative side of the grid, so that the potential apparently does not vary with respect to the ground point on average. Thus, there is almost no potential variation with respect to the stray capacitance of the DC power supply 10, so that leakage current hardly flows.

As described above, in the unipolar modulation, upper and lower semiconductor switching elements on one side that compose the inverter are turned ON/OFF only in accordance with whether the grid is positive or negative. Therefore, the number of times of switching is small and switching loss decreases. In addition, since the voltage applied to the reactor is only positive and zero or only negative and zero, there is an advantage that the reactor can be downsized as compared to the bipolar modulation. However, there is a disadvantage that leakage current occurs. In contrast, in the bipolar modulation, all the switching elements constantly perform switching and thus there is a disadvantage that switching loss increases as compared to the unipolar modulation, but there is an advantage that leakage current can be suppressed. Therefore, in a case where a power supply that is not grounded, such as a solar battery, is connected to the grid, operation by the bipolar modulation is needed in consideration of the risk of leakage current due to the stray capacitance.

[Description of Operations of Converter 2 and Inverter 3 Based on Bipolar Modulation Control]

(1) Description of Operation of Converter 2

Hereinafter, operations of the converter 2 and the inverter 3 in FIG. 1 which are based on the bipolar modulation control for the above reason, will be described in detail. The converter 2 is controlled so that the input voltage or the output voltage follows a command value, and the inverter 3 is controlled so that the output current follows a command value. Here, it is assumed that the converter 2 is controlled so that the input voltage follows the command value, as an example. Input voltage control is performed so that the detection value of the converter input voltage detector 25 detecting the voltage of the smoothing capacitor 11 follows a predetermined command value.

Figure 7:
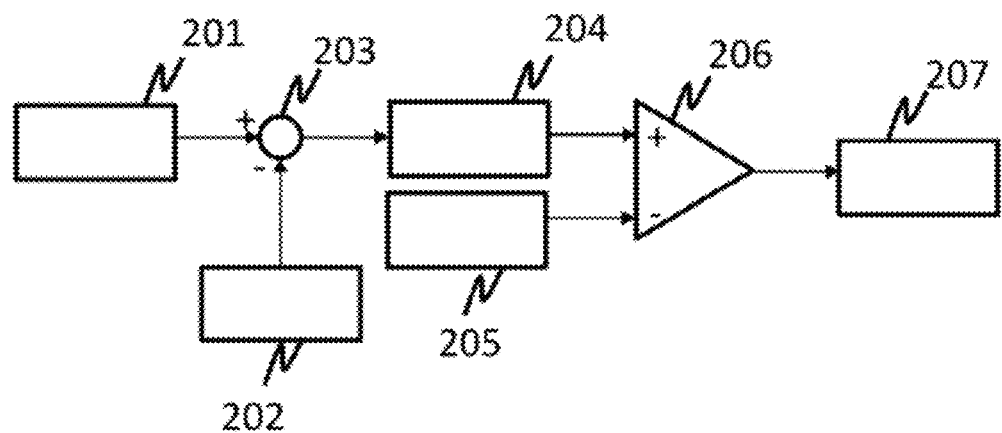
FIG. 7 illustrates a function of control for a converter according to embodiment 1.

FIG. 7 shows control of the converter 2 performed by the control device 24. The control in FIG. 7 is configured from an input voltage command value 201, an input voltage detection value 202, a calculator 203, a controller 204, a triangular wave carrier generator 205, a comparator 206, and a control output 207. The input voltage command value 201 and the input voltage detection value 202 are subjected to calculation by the calculator 203, and the calculation result is subjected to necessary processing so as to follow a command value by the controller 204. This processing is performed using proportional integral control, proportional control, or integral control, for example. The output of the controller 204 and the value of a triangular wave carrier generated by the triangular wave carrier generator 205 are compared with each other by the comparator 206, whereby the control output 207 is outputted.

As described later in detail with reference to FIG. 9A, if the output of the controller 204 is greater than the value of the triangular wave carrier, the output value of the control output 207 becomes 1, and if the output of the controller 204 is smaller than the value of the triangular wave carrier, the output value of the control output 207 becomes 0. Here, the output value 1 becomes a drive signal for turning ON the semiconductor switching element 13, and the output value 0 becomes a drive signal for turning OFF the semiconductor switching element 13. Through the above control, the converter 2 can cause the input voltage to follow the command value.

Regarding current outputted from the converter 2 at this time, as is found from the circuit configuration in FIG. 1, when the semiconductor switching element 13 is ON, current flows through a route connecting the DC power supply 10, the reactor 12, and the semiconductor switching element 13, so that current does not flow to the converter output side. When the semiconductor switching element 13 is OFF, current flows through a route connecting the DC power supply 10, the reactor 12, the diode 14, and the smoothing capacitor 15 or a route connecting the DC power supply 10, the reactor 12, the diode 14, and the inverter 3. Whether current flows to the smoothing capacitor 15 or the inverter 3 is determined depending on the switching state of the inverter 3 and the current route in the inverter 3.

(2) Description of Operation of Inverter 3

Figure 8:
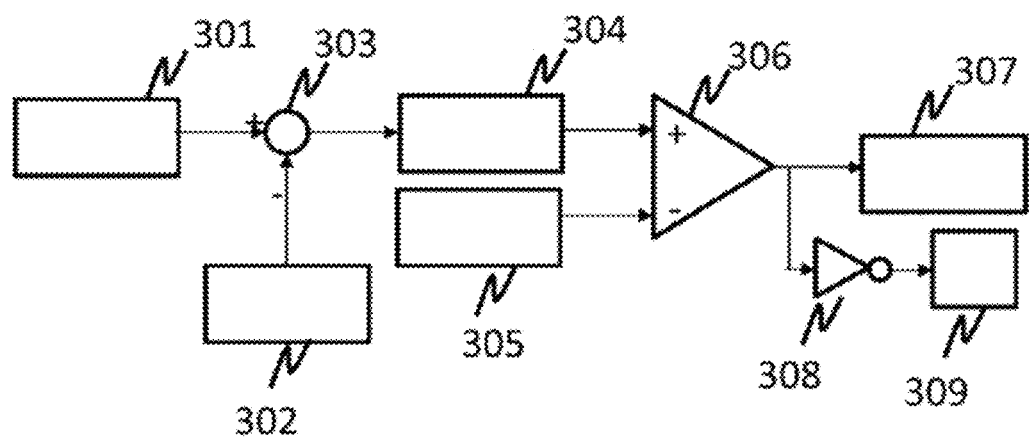
FIG. 8 illustrates a function of control for the inverter according to embodiment 1.

Next, FIG. 8 shows control of the inverter 3 performed by the control device 24. The control in FIG. 8 is configured from an output current command value 301, an output current detection value 302, a calculator 303, a controller 304, a triangular wave carrier generator 305, a comparator 306, a control output 307, an inverting unit 308, and a control output 309. The output current command value 301 and the output current detection value 302 are subjected to calculation by the calculator 303, and the calculation result is subjected to necessary processing so as to follow a command value by the controller 304. This processing is performed using proportional integral control or proportional control, for example. The output of the controller 304 and the value of a triangular wave carrier generated by the triangular wave carrier generator 305 are compared with each other by the comparator 306, whereby the control output 307 is outputted. In addition, the output of the comparator 306 is inverted by the inverting unit 308, whereby the control output 309 is outputted. Instead of the output current command value 301 and the output current detection value 302, an output voltage command value and an output voltage detection value may be used.

As described later in detail with reference to FIG. 9B, if the output of the controller 304 is greater than the value of the triangular wave carrier, the output value of the control output 307 becomes 1, and if the output of the controller 304 is smaller than the value of the triangular wave carrier, the output value of the control output 307 becomes 0. Here, the output value 1 is a signal for turning ON the semiconductor switching element, and the output value 0 is a signal for turning OFF the semiconductor switching element. The control output 307 is used as drive signals for the semiconductor switching element 16 and the semiconductor switching element 19 composing the inverter 3, and the control output 309 is used as drive signals for the semiconductor switching element 17 and the semiconductor switching element 18. Since the inverted output signal is used, the semiconductor switching element 16 and the semiconductor switching element 17 are not turned ON at the same time, and therefore such a route as to short-circuit the positive side and the negative side of the smoothing capacitor 15 does not occur. Similarly, the semiconductor switching element 18 and the semiconductor switching element 19 are not turned ON at the same time, and therefore such a route as to short-circuit the positive side and the negative side of the smoothing capacitor 15 does not occur.

However, in actuality, a finite length of time is required for the semiconductor switching element to turn ON or OFF. For example, in a case where a signal for turning ON the semiconductor switching element 17 is outputted at the moment when a signal for turning OFF the semiconductor switching element 16 is outputted, there is a possibility that, due to delay in a drive circuit or the like, the semiconductor switching element 17 is turned ON even though the semiconductor switching element 16 is still ON. Therefore, in general, it is preferable to provide a dead time in which the semiconductor switching element 16 and the semiconductor switching element 17 are both OFF.

The dead time is often set to about several microseconds, and meanwhile, in a case where high-speed switching can be performed and short-circuit does not occur, it is also possible to set a short dead time of several hundred nanoseconds or several ten nanoseconds. Also in the converter 2, in a case where a semiconductor switching element is used instead of the diode 14 to perform switching, it is preferable to provide a dead time so that the semiconductor switching element is not turned ON at the same time as the semiconductor switching element 13.

(3) Current Inputted to Inverter 3

Next, current inputted to the inverter 3 will be described. Although previously described in FIG. 6A to FIG. 6D, description will be given again regarding cases (i) to (iv) below individually. The current route in the inverter 3 differs depending on the phases of AC voltage and AC current. In the drawings, the direction in which current flows from the left to the right through the reactor 20 is defined as positive. As to the voltage, when the voltage is measured at both ends of the smoothing capacitor 15, if the upper side is positive, the voltage is defined as positive, and if the upper side is negative, the voltage is defined as negative.

(i) Case where AC Voltage and AC Current are Positive (see FIG. 6A)

In the inverter 3, when the semiconductor switching element 16 and the semiconductor switching element 19 are ON and the semiconductor switching element 17 and the semiconductor switching element 18 are OFF, current flows through a route connecting the semiconductor switching element 16, the reactor 20, the capacitor 22 or the grid 23, and the semiconductor switching element 19. Whether a current route on the input side of the inverter 3 passes the smoothing capacitor 15 or the inside of the converter 2 is determined depending on the state of the semiconductor switching element 13 of the converter 2.

(ii) Case where AC Voltage is Negative and AC Current is Positive (see FIG. 6B)

In the inverter 3, when the semiconductor switching element 17 and the semiconductor switching element 18 are ON and the semiconductor switching element 16 and the semiconductor switching element 19 are OFF, current flows through a route connecting the diode of the semiconductor switching element 18, the reactor 20, the capacitor 22 or the grid 23, the reactor 21, the diode of the semiconductor switching element 17, and the smoothing capacitor 15. While the current flows in a direction from the positive electrode to the negative electrode of the smoothing capacitor 15, the current does not flow into the converter 2 side because the diode 14 is present in the converter 2. However, in a case where a semiconductor switching element is used instead of the diode 14, there can be a route of the current flowing into the converter if the semiconductor switching element is turned ON.

(iii) Case where AC Voltage is Positive and AC Current is Negative (see FIG. 6C)

In the inverter 3, when the semiconductor switching element 16 and the semiconductor switching element 19 are ON and the semiconductor switching element 17 and the semiconductor switching element 18 are OFF, current flows through a route connecting the diode of the semiconductor switching element 19, the reactor 21, the capacitor 22 or the grid 23, the reactor 20, the diode of the semiconductor switching element 16, and the smoothing capacitor 15. While the current flows in a direction from the positive electrode to the negative electrode of the smoothing capacitor 15, the current does not flow into the converter 2 side because the diode 14 is present in the converter 2. However, in a case where a semiconductor switching element is used instead of the diode 14, there can be a route of the current flowing into the converter if the semiconductor switching element is turned ON.

(iv) Case where AC Voltage is Negative and AC Current is Negative (see FIG. 6D)

When the semiconductor switching element 17 and the semiconductor switching element 18 are ON and the semiconductor switching element 16 and the semiconductor switching element 19 are OFF, current flows through a route connecting the semiconductor switching element 17, the reactor 21, the capacitor 22 or the grid 23, the reactor 20, and the semiconductor switching element 18. Whether a current route on the input side of the inverter 3 passes the smoothing capacitor 15 or the inside of the converter 2 is determined depending on the state of the semiconductor switching element 13 of the converter 2.

(4) Current Flowing to Smoothing Capacitor 15 Through Operations of Converter 2 and Inverter 3

Figure 9A:
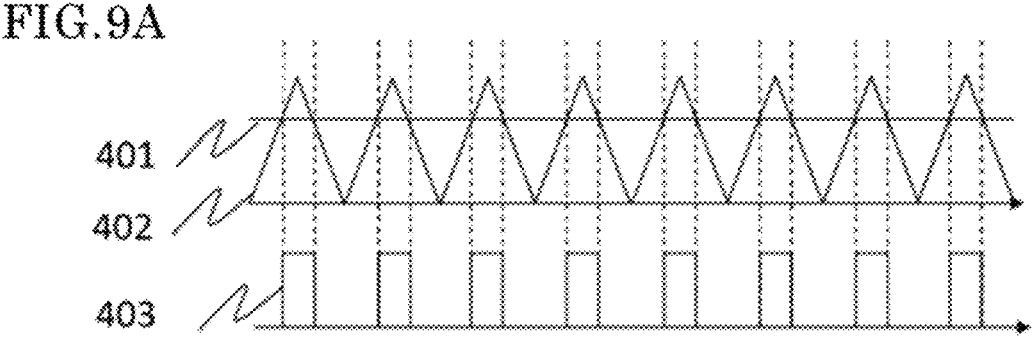
FIGS. 9A, 9B, and 9C show a problem with a current waveform in a smoothing capacitor through operations of the converter and the inverter according to embodiment 1.
Figure 9B:
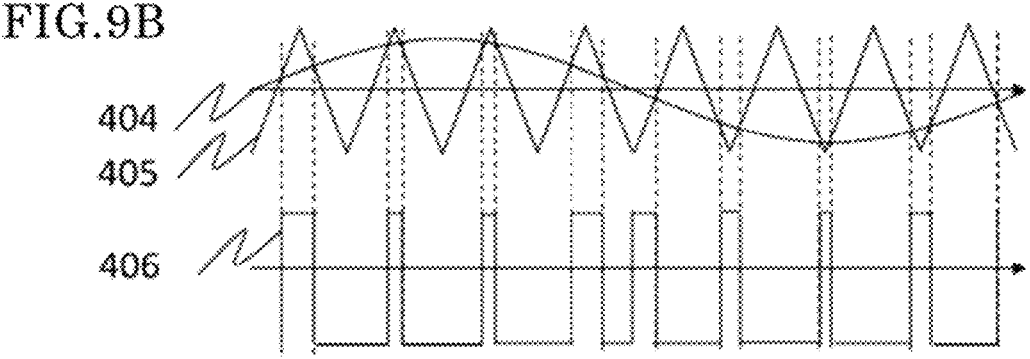
Figure 9C:
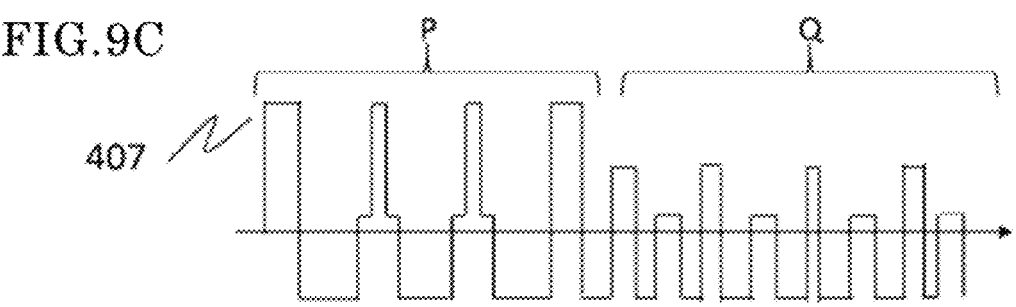

FIGS. 9A, 9B and 9C are waveform diagrams showing the relationship between operations of the converter 2 and the inverter 3, and current of the smoothing capacitor 15. It is assumed that the triangular wave carriers for the converter 2 and the inverter 3 operate synchronously at the same frequency and the same phase.

(i) Current Flowing from Converter 2 to Smoothing Capacitor 15

In the converter operation, a control command value 401 for the converter 2 and a triangular wave carrier 402 for the converter 2 are compared with each other, and if the control command value 401 is greater than the triangular wave carrier 402, the semiconductor switching element 13 is turned ON. In this case, current does not flow from the converter 2 through the diode 14 to the smoothing capacitor 15. If the control command value 401 for the converter 2 is smaller than the triangular wave carrier 402 for the converter 2, the semiconductor switching element 13 is turned OFF. In this case, current flows from the converter 2 through the diode 14. The current outputted from the diode 14 of the converter 2 on the basis of ON/OFF operation of the semiconductor switching element 13 is represented as current 403.

(ii) Current Flowing from Inverter 3 to Smoothing Capacitor 15

In the inverter operation, a control command value 404 for the inverter 3 and a triangular wave carrier 405 for the inverter are compared with each other, and if the control command value 404 is greater than the triangular wave carrier 405, the semiconductor switching element 16 and the semiconductor switching element 19 are turned ON and the semiconductor switching element 17 and the semiconductor switching element 18 are turned OFF (cases in FIG. 6A, FIG. 6C). This state is defined as a switching state 1 of the inverter 3.

If the control command value 404 for the inverter 3 is smaller than the triangular wave carrier 405, the semiconductor switching element 16 and the semiconductor switching element 19 are turned OFF and the semiconductor switching element 17 and the semiconductor switching element 18 are turned ON (cases in FIG. 6B, FIG. 6D). This state is defined as a switching state 2 of the inverter 3.

In a case where the inverter 3 transmits power while the power factor of AC voltage and AC current is 1, the control command value 404 for the inverter 3 also has the same phase as the AC voltage or the AC current. Regarding current flowing through the inverter when the inverter output voltage is positive, in a case of the switching state 1, current flowing from the input side of the inverter flows through the semiconductor switching element 16, the reactor 20, the grid 23, the reactor 21, and the semiconductor switching element 19, as shown in FIG. 6A. Therefore, the current flowing through the reactor 20 flows from the left to the right of the reactor 20 in the drawing. Looking at the input end of the inverter 3, the current flows in a direction of flowing into the positive-side input end. From where the input current to the inverter flows depends on the switching state of the converter 2. In this case, current does not flow to the smoothing capacitor 15.

In a case where the output voltage is positive and the inverter is in the switching state 2, as shown in FIG. 6B, current flowing in the inverter 3 flows through the semiconductor switching element 18, the reactor 20, the grid 23, the reactor 21, and the semiconductor switching element 17. Therefore, the current flowing through the reactor 20 flows from the left to the right of the reactor 20 in the drawing. Looking at the input end of the inverter 3, the current flows in a direction of flowing out from the positive-side input end. At this time, the current at the positive-side input end of the inverter 3 cannot flow through the diode 14, and flows to the smoothing capacitor 15.

In a case where the inverter transmits power with a power factor of 1 and the inverter output voltage is negative, current flowing in the inverter in the switching state 2 is as follows. As shown in FIG. 6D, current flowing from the input side of the inverter 3 flows through the semiconductor switching element 17, the reactor 21, the grid 23, the reactor 20, and the semiconductor switching element 18. The current flows in a direction from the left to the right of the reactor 21. Looking at the input end of the inverter 3, the current flows in a direction of flowing into the positive-side input end of the inverter. From where the input current to the inverter flows depends on the switching state of the converter. In this case, the current does not flow to the smoothing capacitor 15.

In a case where the output voltage is negative and the inverter is in the switching state 1, as shown in FIG. 6C, current flowing in the inverter 3 flows through the semiconductor switching element 19, the reactor 21, the grid 23, the reactor 20, and the semiconductor switching element 16. The current flows in a direction from the left to the right of the reactor 21. Looking at the input end of the inverter, the current flows in a direction of flowing out from the positive-side input end of the inverter. At this time, the current at the positive-side input end of the inverter cannot flow through the diode 14 because the diode 14 is connected in the direction that does not allow the current to flow, and the current at this time flows to the smoothing capacitor 15.

(iii) Total Current Flowing Through Smoothing Capacitor 15

Thus, as shown in FIG. 9C, current obtained by combining the current outputted from the converter 2 and the current flowing out from the inverter 3 is current 407 flowing to the smoothing capacitor 15. In the waveform of the current 407, when current outputted from the converter 2 and current outputted from the input end of the inverter 3 flow to the smoothing capacitor 15 at the same time, current ripple increases. On the other hand, if the timing of current flowing out from the output of the converter 2 is the same as the timing of current flowing into the inverter 3, current flowing to the smoothing capacitor 15 corresponds to the difference between both currents, so that current ripple decreases.

Therefore, in a case where the output AC voltage of the inverter 3 is positive and the power factor is 1, as shown in a period P in FIG. 9C, the timing of current flowing out from the output side of the converter 2 and the timing of the current flowing into the input side of the inverter 3 are greatly different from each other. Thus, each of the current routes passes the smoothing capacitor 15, resulting in increase in the amplitude of current ripple in the smoothing capacitor 15.

On the other hand, in a case where the output voltage of the inverter 3 is negative and the power factor is 1, as shown in a period Q in FIG. 9C, the timing of current flowing out from the output side of the converter 2 and the timing of current flowing into the input side of the inverter 3 are close to each other. Thus, in each of the current routes, current mostly flows from the converter 2 to the inverter 3 directly without passing the smoothing capacitor 15, so that the amplitude of current ripple of the smoothing capacitor 15 is reduced.

Figure 10:
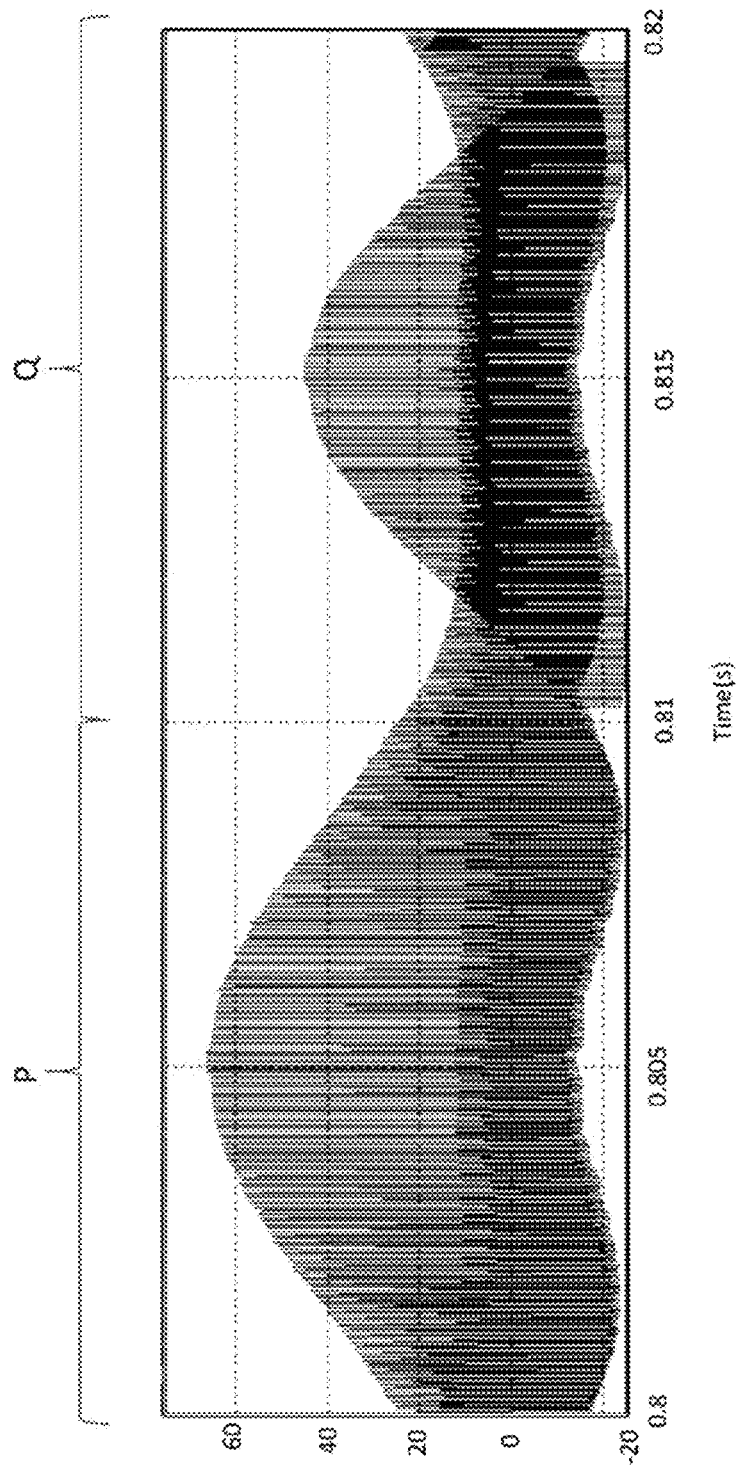
FIG. 10 shows a current waveform flowing into the smoothing capacitor in one cycle of AC in FIGS. 9A, 9B, and 9C.

When current ripple of the smoothing capacitor 15 is small, heat generation caused by current flowing is suppressed, leading to increase in the life. In addition, reduction in heat generation enables reduction in the capacitance of the capacitor, leading to cost reduction. However, as described above, since the output current of the inverter 3 flows into the smoothing capacitor 15 in positive and negative directions, there are a period in which the amplitude of current ripple is small and a period in which the amplitude of current ripple is great. In FIGS. 9A, 9B and 9C for simplifying the description, the triangular wave carrier 405 is generated 8 times per one cycle of AC, but in actuality, the triangular wave carrier is generated much more times per one cycle of AC. For example, in a case where the AC frequency is 50 Hz and the frequency of the triangular wave carrier is 20 kHz, the triangular wave carrier is generated 400 times per one cycle of AC. In this case, current flowing into the smoothing capacitor 15 in one cycle of AC is as shown in FIG. 10. From this graph, it can be confirmed that the waveform of the high-frequency ripple current differs between half cycles of AC, and the current amplitude in the period P is great.

[Configuration for Reducing High-Frequency Ripple Current Occurring in Smoothing Capacitor 15]

Figure 11A:
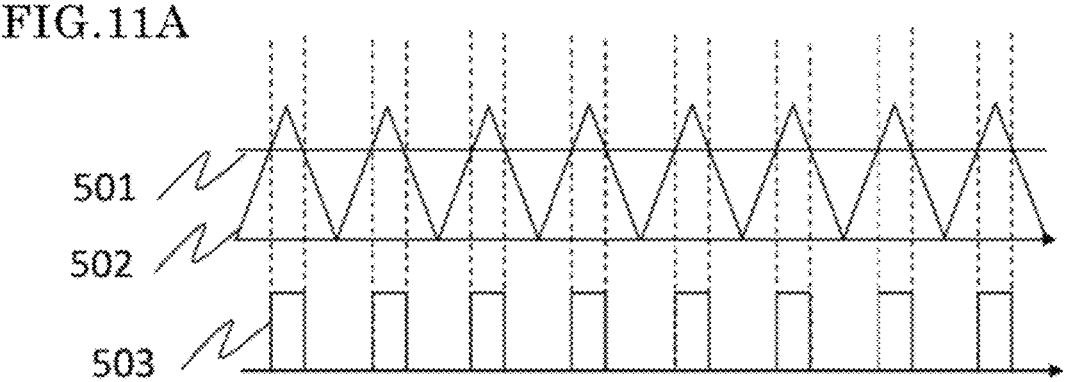
FIGS. 11A, 11B and 11C show a current waveform in the smoothing capacitor through operations of the converter and the inverter for solving the problem in FIGS. 9A, 9B, and 9C.
Figure 11B:
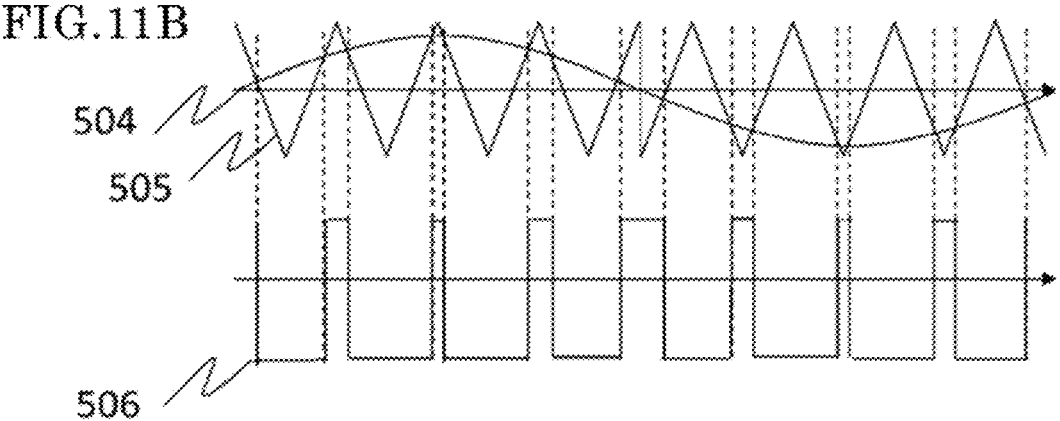
Figure 11C:
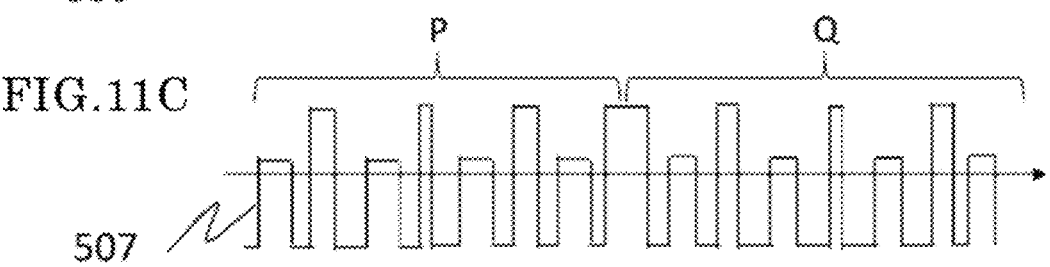

FIGS. 11A, 11B, and 11C show operation in the present embodiment for reducing high-frequency ripple current in the half cycle (period P) of AC as described above. FIG. 11 shows a command value 501 for the converter 2, a triangular wave carrier 502 for the converter 2, current 503 outputted from the converter 2, an inverter command value 504, a triangular wave carrier 505, current 506 flowing out from the input side of the inverter 3, and current 507 of the smoothing capacitor 15. Also in FIGS. 11A, 11B, and 11C, the triangular wave carriers for the converter 2 and the inverter 3 are synchronous at the same frequency and the same phase, as in FIGS. 9A, 9B and 9C. In addition, operation of the converter 2 is the same as in FIGS. 9A, 9B and 9C and therefore the description thereof is omitted here.

Regarding the inverter 3, while the frequency of the triangular wave carrier 505 is the same, the difference is that the phase of the triangular wave carrier 505 is inverted by 180 degrees between when the command value 504 is positive in the period P and when the command value 504 is negative in the period Q. Here, the triangular wave carrier 505 when the command value 504 is positive is inverted by 180 degrees relative to the triangular wave carrier 502 for the converter 2. When the command value 504 is negative, the phases of the triangular wave carrier 505 and the triangular wave carrier 502 are identical to each other. In this way, by providing the period in which the triangular wave carrier is inverted, the timing of current flowing out from the input end of the inverter 3 is shifted only in the period in which the command value for the inverter is positive (period P). Thus, the timing of current flowing out from the converter 2 and the timing of current flowing into the inverter 3 more overlap each other (in other words, the timing of current flowing out from the converter 2 to the smoothing capacitor 15 and the timing of current flowing out from the inverter 3 to the smoothing capacitor 15 are made different from each other), so that the amount of current ripple flowing from/into the smoothing capacitor 15 can be reduced.

Figure 12:
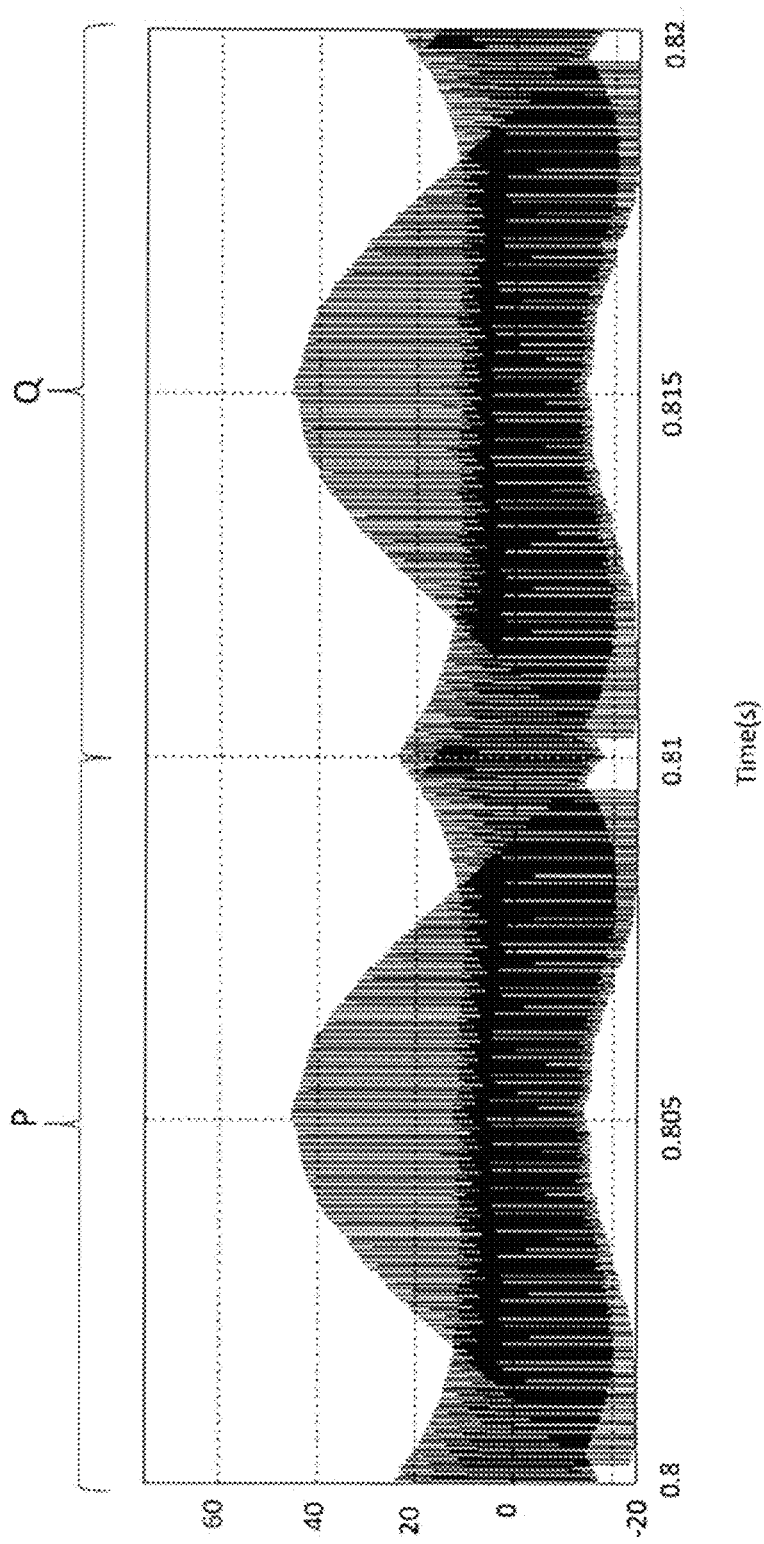
FIG. 12 shows a current waveform flowing into the smoothing capacitor in one cycle of AC in FIG. 11.

For example, in a case where the AC frequency is 50 Hz and the frequency of the triangular wave carrier is 20 kHz, the triangular wave carrier is generated 400 times per one cycle of AC. In this case, current flowing into the smoothing capacitor 15 in one cycle of AC through operation based on the method of the present embodiment is as shown in FIG. 12. In FIG. 12, it can be confirmed that the waveform of high-frequency ripple current is the same between the period P and the period Q in half cycles of AC, and the current amplitude in the half cycle is reduced as compared to FIG. 10.

In the above description, it is assumed that the frequencies of the triangular wave carriers for the inverter 3 and the converter 2 are the same. However, the frequencies of the triangular wave carriers may be different from each other. If the triangular wave carriers are different, a period of one cycle differs, and a period in which current flows also differs. For example, in a case where current flows for 10 microseconds in one cycle at a certain frequency, if the triangular wave carrier is doubled, the period is divided into two periods of 5 microseconds and the average current is the same. Thus, the period in which current flows from the converter 2 to the inverter 3 is divided into thin pieces, leading to increase in periods in which current flows to the smoothing capacitor temporarily, so that the effect obtained by inverting the phase of the carrier by 180 degrees is reduced. A simulation was conducted while the triangular wave carriers for the inverter 3 and the converter 2 were set to constant multiples of each other, and the current effective values were compared. Then, as shown in FIG. 13, it can be confirmed that the high-frequency current effective value of the smoothing capacitor 15 is reduced both when the frequency of the inverter 3 is higher than the frequency of the converter 2 and when the frequency of the converter 2 is higher than the frequency of the inverter 3.

Embodiment 2

Next, a case where there are a plurality of converters will be described using a power conversion device shown in FIG.

Figure 14:
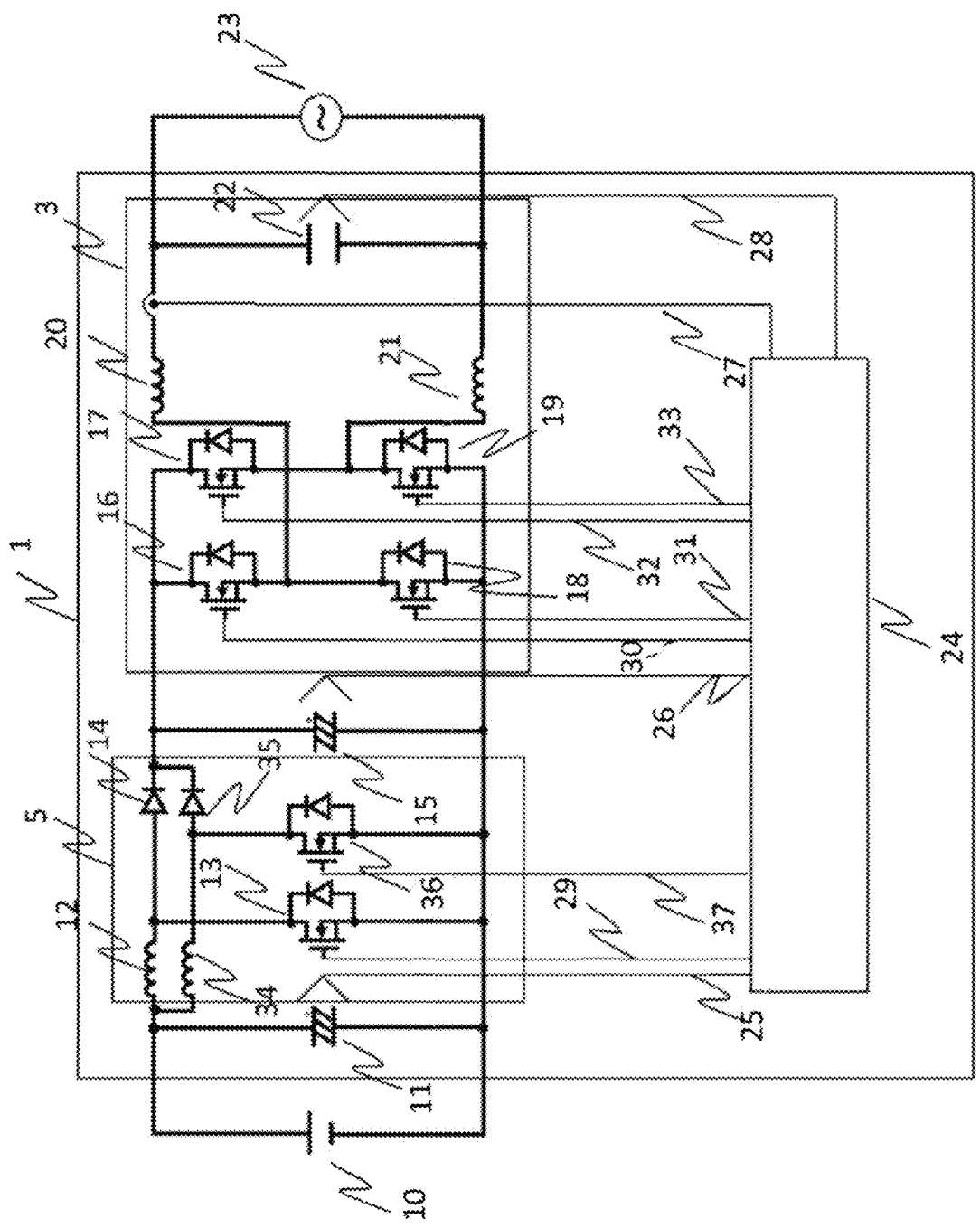
FIG. 14 is a diagram showing the circuit configuration of a power conversion device according to embodiment 2.

14. In FIG. 14, a converter 5 in which two boost choppers are connected in parallel, is provided, as compared to the circuit configuration in FIG. 1. The same parts as those in FIG. 1 are denoted by the same reference characters, and the description thereof is omitted here.

The converter 5 is composed of a first converter in which the reactor 12, the semiconductor switching element 13, and the diode 14 are connected, and a second converter in which a reactor 34, a semiconductor switching element 36, and a diode 35 are connected. One end of the reactor 12 is connected to one end of the reactor 34, the cathode of the diode 35 is connected to the cathode of the diode 14, and the negative electrode of the semiconductor switching element 36 is connected to the negative electrode of the semiconductor switching element 13. The semiconductor switching element 36 is driven by a drive signal 37.

One of advantages by connecting a plurality of converters in parallel in the converter 5 as described above is that current can be distributed and thus the rated currents of parts composing the first and second converters can be reduced. It is noted that, if the drive signal 29 for the first converter and the drive signal 37 for the second converter are generated using the control as shown in FIG. 2 described in embodiment 1, drive signals that are completely identical to each other are inputted to the semiconductor switching element 13 and the semiconductor switching element 36, but in actuality, depending on individual variations among parts, signal timings may slightly differ or the lengths of ON/OFF periods may differ. As a result, current is biased to one of the converters. Therefore, although not shown here, it is preferable that, for example, current detectors for detecting currents of the reactor 12 and the reactor 34 are provided to measure the currents, and control is performed so as to balance the currents, or operation is performed in a discontinuous mode in which the currents of the reactor 12 and the reactor 34 necessarily become zero in one cycle.

Figure 15A:
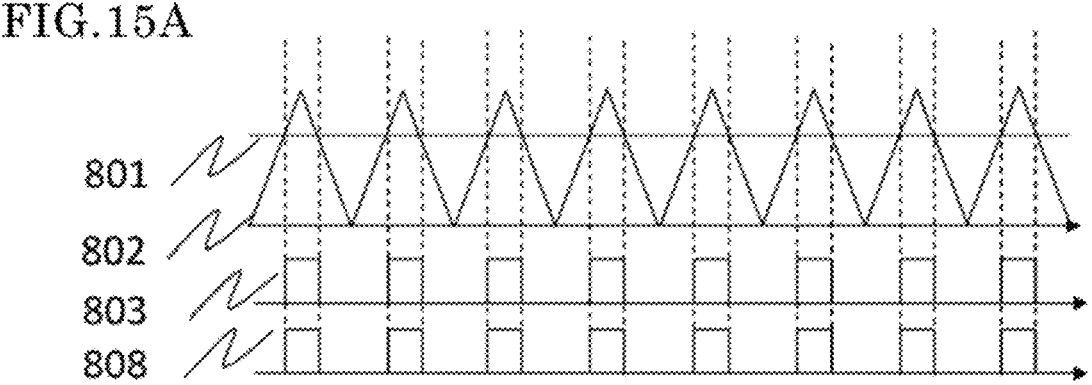
FIGS. 15A, 15B and 15C show a current waveform in a smoothing capacitor through operations of a converter and an inverter according to embodiment 2.
Figure 15B:
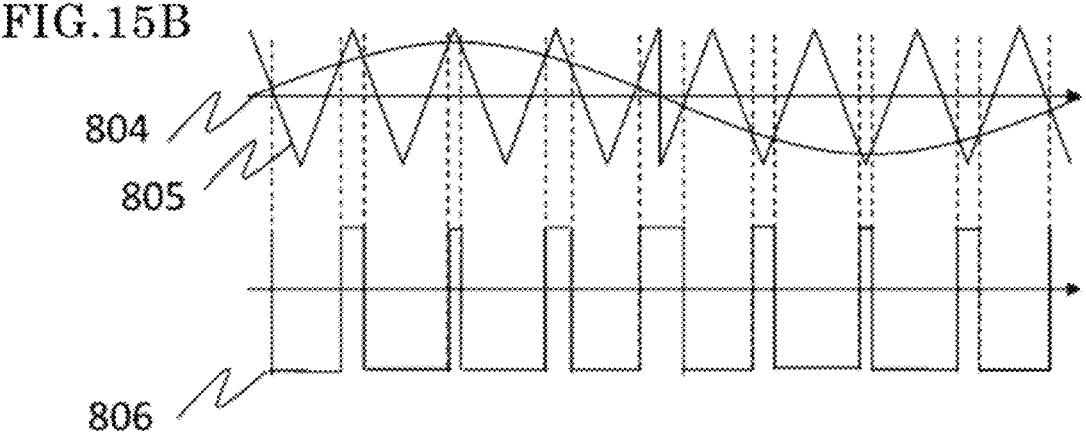
Figure 15C:
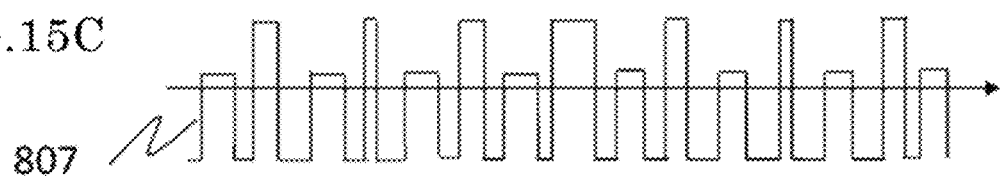

FIGS. 15A, 15B, and 15C show a command value 801 for the converter 5, a triangular wave carrier 802 for the converter 5, currents 803, 808 outputted from the converter 5, an inverter command value 804, a triangular wave carrier 805, current 806 flowing out from the input side of the inverter 3, and current 807 of the smoothing capacitor 15. Also in FIGS. 15A, 15B and 15C, the triangular wave carriers for the converter 5 and the inverter 3 are synchronous at the same frequency and the same phase, as in FIGS. 9A, 9B and 9C.

In a case where all of the carrier waves for the plurality of converters connected in parallel are the same, current flowing out from the converter 5 is as shown in FIG. 15A. Since the first converter and the second converter are connected in parallel, the sum of the current 803 flowing out from the diode 14 and the current 808 flowing out from the diode 35 is the current flowing out from the converter 5. It is noted that, since the carrier waves are the same, the timings of currents flowing out from the respective converters connected in parallel are the same, and the current outputted from the converter 5 is the same as the current 503 outputted from the converter 2 in FIGS. 11A, 11B and 11C. FIG. 15B is the same as in FIG. 11B, and the description thereof is omitted. As shown in FIG. 15C, the amount of current ripple flowing from/into the smoothing capacitor 15 can be reduced, as in FIG. 11C.

Embodiment 3

Figure 16A:
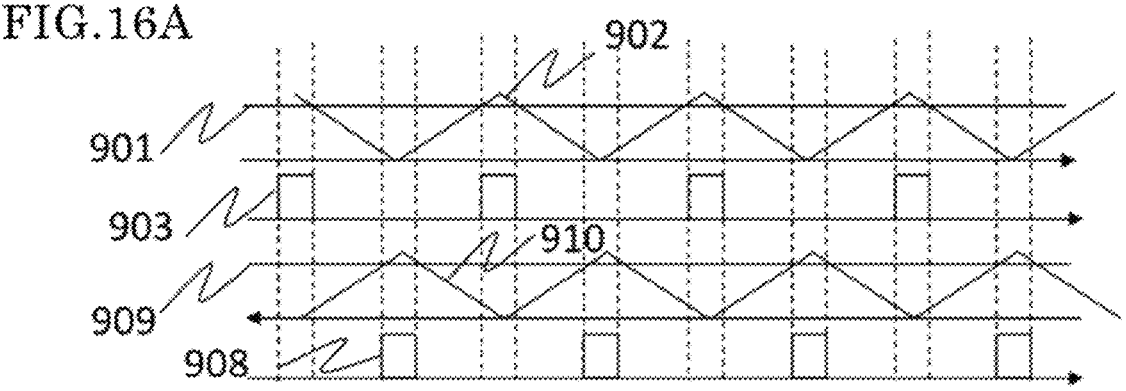
FIGS. 16A, 16B and 16C show a current waveform in a smoothing capacitor through operations of a converter and an inverter according to embodiment 3.

In a case where there are a plurality of converters, the phases of carrier waves therefor may be shifted from each other at equal intervals in accordance with the number of the parallel converters, to perform operation. For example, in a case where two converters 5 are connected in parallel as described above in FIG. 14, the phases are shifted from each other by 180 degrees, and in a case of three parallel converters, the phases are shifted from each other by 120 degrees. The waveform in a case of operating by this method is as shown in FIG. 16A. Here, a case where two converters 5 are connected in parallel, the phases of carrier waves for the first and second converters are shifted from each other by 180 degrees, and the carrier waves are ½ times the carrier wave for the inverter, is shown. In accordance with the number of converters connected in parallel, the phases of a plurality of carrier waves therefor are shifted from each other at equal intervals, and the frequencies of the plurality of carrier waves are represented as follows:

(frequency of second carrier wave/number of converters)×constant.

Figure 16B:
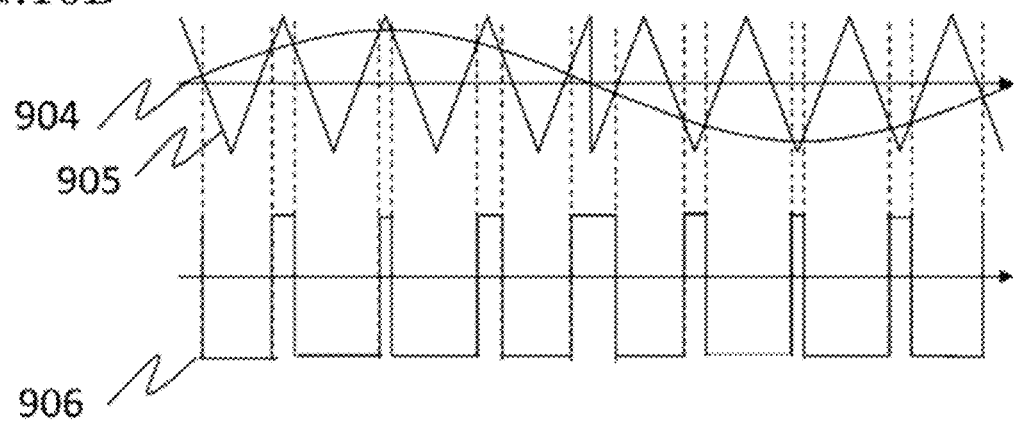
Figure 16C:
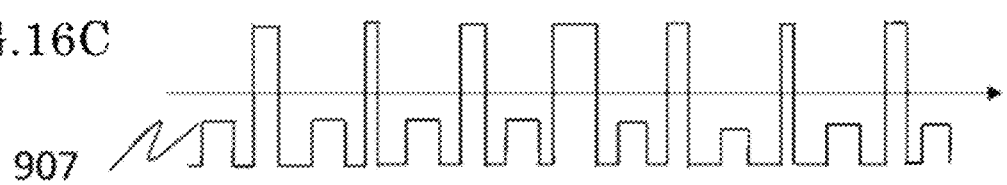

FIGS. 16A, 16B and 16C show command values 901, 909 for the converter 5, triangular wave carriers 902, 910 for the converter 5, currents 903, 908 outputted from the converter 5, an inverter command value 904, a triangular wave carrier 905, current 906 flowing out from the input side of the inverter 3, and current 907 of the smoothing capacitor 15.

As shown in FIG. 16A, the phases of the carrier waves for the first converter and the second converter are shifted from each other by 180 degrees, and therefore, even when the command values for the respective converters are almost equal to each other, the timings of turning ON are different from each other by 180 degrees. Thus, current outputted from the converter 5 arises at two times the frequency of the carrier waves of the converter. Therefore, when the carrier waves for the converter are ½ times the carrier wave for the inverter, the frequencies of high-frequency ripple currents of current flowing out from the converter 5 and current flowing into the inverter become equal to each other. Accordingly, as shown in FIG. 16B and FIG. 16C, by inverting the carrier wave for the inverter, it becomes possible to reduce high-frequency ripple current flowing into the smoothing capacitor 15.

In the above description, discussion has been made under the assumption that the power factor is 1. Therefore, the AC voltage, the AC current, the inverter current command value, and the inverter control command value to be compared with the carrier wave have AC waveforms with almost the same phase. However, in a case where the phases of the AC voltage and the AC current are changed and the power factor is changed, the phase of the current command value for the inverter 3 might be shifted. In this case, it is necessary to determine which waveform should be used when performing switchover on the basis of positive and negative polarities of the waveform. In this regard, in light of the purpose of reducing current flowing in/out, it is most effective to invert the phase of the carrier wave by 180 degrees on the basis of positive/negative switchover of the current command value for the inverter 3 or the output current of the inverter 3. However, even in a case of performing switchover on the basis of positive and negative polarities of the AC voltage or the inverter control command value, high-frequency ripple current of the smoothing capacitor 15 can be reduced as compared to a case of not taking such measures.

Embodiment 4

In embodiments 1 to 3, the case of inverting the carrier wave for the inverter 3 by 180 degrees has been described.

Figure 17A:
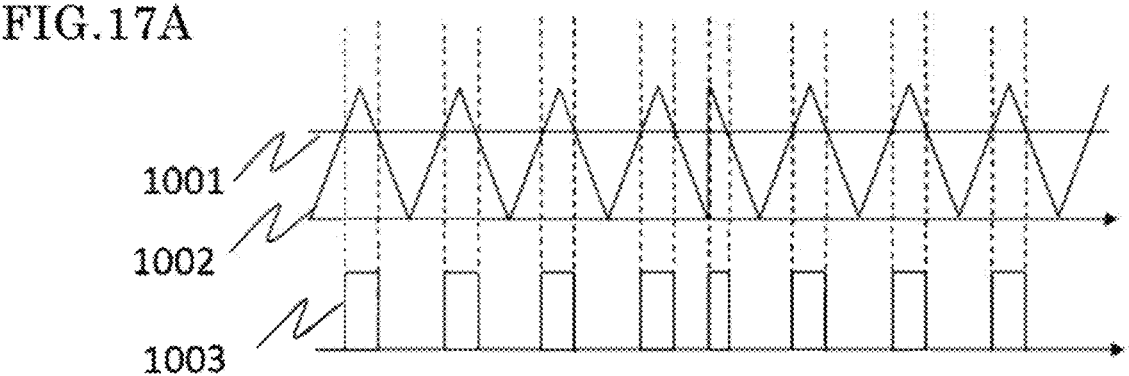
FIGS. 17A, 17B and 17C show a current waveform in a smoothing capacitor through operations of a converter and an inverter according to embodiment 4.
Figure 17B:
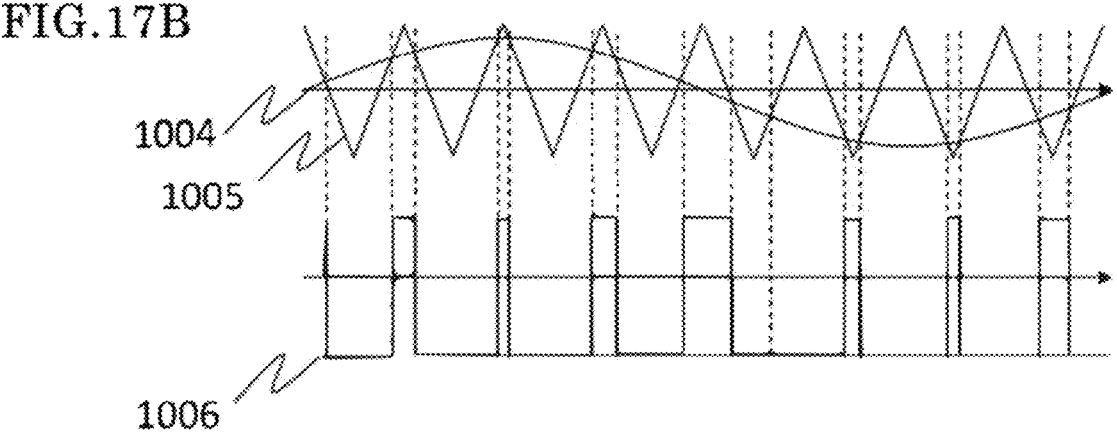
Figure 17C:
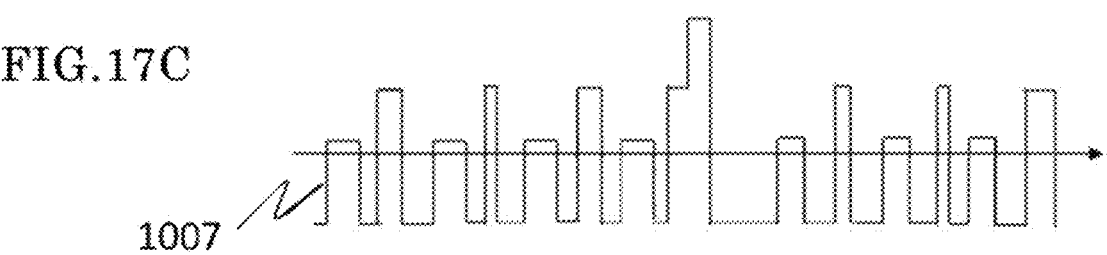

Instead, the carrier wave for the converter 2 may be inverted by 180 degrees in accordance with the positive and negative polarities of the AC waveform of the inverter 3. FIGS. 17A, 17B, and 17C show a command value 1001 for the converter 2, a triangular wave carrier 1002 for the converter 2, current 1003 outputted from the converter 2, an inverter command value 1004, a triangular wave carrier 1005, current 1006 flowing out from the input side of the inverter 3, and current 1007 of the smoothing capacitor 15.

Through such control, as shown in FIG. 17C, the current flow-in/out relationship between the inverter 3 and the converter 2 can be made so as to reduce high-frequency ripple current flowing from/into the smoothing capacitor 15.

It is most effective to invert the phase of the carrier wave by 180 degrees. However, the phase shift is not necessarily limited to 180-degree inversion, and even in a case of using a small phase shift such as 90 degrees, the effect of reducing high-frequency ripple current of the smoothing capacitor 15 is obtained.

In this way, since high-frequency ripple current flowing into the smoothing capacitor 15 can be reduced, heat generation in the smoothing capacitor 15 can be suppressed, whereby the life can be prolonged.

Because of a detection delay due to the sensor and the like, there is a case where the changing cannot be performed at the exact timing of positive/negative switchover. However, the same effects are obtained if the phase of the triangular wave carrier is switched at a timing around the positive/negative switchover. After the polarity is switched between positive and negative, the phase may be switched at the timing when the top or the bottom of the triangular wave carrier comes. Thus, setting for switchover can be easy.

In the above embodiments, the case where the converter 2 or 5 is a non-insulation chopper circuit has been described. However, even in a case of using an insulation-type DC-DC conversion unit or AC-DC conversion unit, it is possible to reduce high-frequency ripple current of the smoothing capacitor 15 in the same manner by changing the phases of the triangular wave carrier on the basis of whether the inverter output is positive or negative.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 power conversion device
2 converter (first conversion unit)
3 inverter (second conversion unit)
10 DC power supply
11 smoothing capacitor
12, 34 reactor
13, 36 semiconductor switching element
14, 35 diode
15 smoothing capacitor
16, 17, 18, 19 semiconductor switching element
20, 21 reactor
22 capacitor
23 grid
24 control device
100 processor
200 storage device
201 input voltage command value
202 input voltage detection value
203 calculator
204 controller
205 triangular wave carrier generator
206 comparator
207 control output
301 output current command value
302 output current detector
303 calculator
304 controller
305 triangular wave carrier generator
306 comparator
307 control output
308 inverting unit
309 control output

The invention claimed is:

1. A power conversion device comprising:
a first converter for outputting DC power through power conversion;
a second converter for converting the DC power to AC power;
a capacitor for smoothing DC voltage between the first converter and the second converter; and
a controller for performing PWM control of the first converter and bipolar modulation PWM control of the second converter, wherein
a frequency of a first carrier wave for the PWM control of the first converter and a frequency of a second carrier wave for the bipolar modulation PWM control of the second converter are synchronized with each other, and
the controller shifts a phase of one carrier wave of the first and second carrier waves between a case where an output of the second converter is positive and a case where the output of the second converter is negative, so that timings of currents flowing into the capacitor from the first converter and the second converter differ from each other.

2. The power conversion device according to claim 1, wherein
the phase of the one carrier wave is shifted so that the current flowing into the capacitor from the first converter and the current flowing into the capacitor from the second converter do not overlap each other.

3. The power conversion device according to claim 1, wherein
the output of the second converter is output current.

4. The power conversion device according to claim 1, wherein
the output of the second converter is output voltage.

5. The power conversion device according to claim 1, wherein
the phase of the one carrier wave is shifted between the case where the output of the second converter is positive and the case where the output of the second converter is negative, on the basis of a control command value of the bipolar modulation PWM control.

6. The power conversion device according to claim 1, wherein
the phase of the one carrier wave is shifted between the case where the output of the second converter is positive and the case where the output of the second converter is negative, on the basis of a current command value of the bipolar modulation PWM control.

7. The power conversion device according to claim 1, wherein
the phase of the one carrier wave is shifted between the case where the output of the second converter is positive and the case where the output of the second converter is negative, on the basis of a voltage command value of the bipolar modulation PWM control.

8. The power conversion device according to claim 1, wherein
the controller inverts the phase of the one carrier wave by 180 degrees between the case where the output of the second converter is positive and the case where the output of the second converter is negative.

9. The power conversion device according to claim 1, wherein
the controller shifts the phase of the second carrier wave.

10. The power conversion device according to claim 9, wherein
the frequency of the first carrier wave and the frequency of the second carrier wave are in a relationship of constant multiples of each other.

11. The power conversion device according to claim 9, wherein
the first converter includes a plurality of converters connected in parallel, and a plurality of carrier waves for driving the plurality of converters are all identical to each other.

12. The power conversion device according to claim 9, wherein
the first converter includes a plurality of converters connected in parallel, phases of a plurality of carrier waves for driving the plurality of converters are shifted from each other at equal intervals, and frequencies of the plurality of carrier waves are represented as follows:

(frequency of second carrier wave/number of converters)×constant.

13. The power conversion device according to claim 1, wherein
the controller shifts the phase of the first carrier wave.

* * * * *